(12) United States Patent
Takamori

(10) Patent No.: US 7,027,181 B2
(45) Date of Patent: Apr. 11, 2006

(54) IMAGE PROCESSING CONDITION DETERMINING APPARATUS, AND IMAGE PROCESSING CONDITION DETERMINING PROGRAM STORAGE MEDIUM

(75) Inventor: Tetsuya Takamori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 954 days.

(21) Appl. No.: 09/909,989

(22) Filed: Jul. 23, 2001

(65) Prior Publication Data

US 2002/0071130 A1    Jun. 13, 2002

(30) Foreign Application Priority Data

Jul. 21, 2000    (JP)    ............................. 2000-221039

(51) Int. Cl.
  *G06F 15/00*    (2006.01)
  *G06F 3/00*    (2006.01)
(52) U.S. Cl. ........................................ 358/1.6; 715/804
(58) Field of Classification Search ................. 358/1.6, 358/1.15, 443, 448; 382/300; 375/240.16, 375/240.15; 715/804; 399/44; 370/537; 709/247
See application file for complete search history.

(56) References Cited

U.S. PATENT DOCUMENTS 6,760,489 B1 *    7/2004    Kuwata ...................... 382/300

* cited by examiner

*Primary Examiner*—Kimberly Williams
*Assistant Examiner*—Saeid Ebrahimi
(74) *Attorney, Agent, or Firm*—Sughrue Mion, PLLC

(57) ABSTRACT

An image processing condition determining apparatus has an image obtaining section for obtaining an initial image, an image processing section for applying image processing to the initial image in accordance with the reference image processing condition and applying image processing to the initial image in accordance with the variation image processing conditions, so that a string of images is created on each of at least three sorts of adjustment parameters, a display section for displaying the image assembly created by said image creating section, and a reference image set up section for setting up one of a plurality of images constituting a plurality of image assemblies displayed on said display section in form of a new reference image according to operation. The image processing section repeats creating of a new string of images, taking as a reference a new reference image processing condition associated with a new reference image.

16 Claims, 14 Drawing Sheets

IMAGE PROCESSING CONDITION DETERMINING APPARATUS, AND IMAGE PROCESSING CONDITION DETERMINING PROGRAM STORAGE MEDIUM

BACKGROUND OF THE INVENTION

1. Field of the Invention

The present invention relates to an image processing condition determining apparatus for determining image processing conditions to define contents of image processing when the image processing is applied to an original image, and an image processing condition determining program storage medium storing an image processing condition determining program which causes a computer system to operate as an image processing condition determining apparatus when the image processing condition determining program is executed in the computer system.

2. Description of the Related Art

Hitherto, it is widely performed that a printed matter is created by a printing machine in accordance with an original image that is obtained through reading a document image by a scanner for instance. In a creating process of the printed matter, usually, an image processing is applied to the original image in order to obtain a good finish of image. This image processing is performed in accordance with a predetermined image processing condition representative of contents of image processing. A suitable set up of the image processing condition makes it possible to apply a desired image processing to the original image.

The image processing condition includes, for example, factors representative of curvatures of a highlight curve, a halftone curve and shadow curve, which represent transformation relationships between density of pretreatment image and density of treated image, in image processing. In other words, the image processing condition is defined by a set of parameter values of a plurality of parameters of the factors as mentioned above.

In the a creating process of the printed matter, usually, there is use an image processing condition determining apparatus for determining such an image processing condition. In the image processing condition determining apparatus, it is known one in which an original image is analyzed to automatically compute and set up image processing condition to be considered as the optimum for the original image in accordance with an analysis result.

For example, a density profile representative of a density distribution of an image is created from the pretreatment image, and the optimum value of the factor representative of the curvature of the highlight curve is automatically computed in accordance with the density profile.

However, there is a case where a tendency of image processing is out of an operator's intention in such a way that an image, which is subjected to the image processing in accordance with the image processing condition thus automatically computed and set up, is always slightly dark, or a green involved in the image processing is always out of the operator's favorite green. And thus, there is a requirement to adjust deviation of such a tendency of image processing.

As an image processing condition determining apparatus, there is known one in which in order that a general operator can readily adjust deviation of such a tendency of image processing, deviation of a tendency of image processing is adjusted in such a manner that a plurality of variation images, wherein the obtained image is varied with respect to a parameter, are displayed, an image is selected from the displayed variation images, and an image processing condition, which involves the selected image, is established as a new image processing condition. Further, there is considered another type of image processing condition determining apparatus in which a desired image is selected from among a plurality of various variation images which are arranged on a two-dimensional base, for example, in such a way that a vertical axis represents brightness and a horizontal axis represents variation of saturation, so that a degree of freedom of adjustment is increased.

However, there exist many sorts of parameters defining an image processing condition. And thus, this involves such problems that it is difficult for an operator to meet a desired image, even if such variation images are displayed.

SUMMARY OF THE INVENTION

In view of the foregoing, it is an object of the present invention to provide an image processing condition determining apparatus capable of determining a desired image processing condition in short time by a general operator, and an image processing condition determining program storage medium storing an image processing condition determining program which causes a computer system to operate as an image processing condition determining apparatus when the image processing condition determining program is executed in the computer system.

To achieve the above-mentioned object, the present invention provides an image processing condition determining apparatus for determining image processing conditions defining contents of image processing wherein an original image is subjected to the image processing, said image processing condition determining apparatus comprising:

an image obtaining section for obtaining an initial image associated with the original image;

an image creating section for performing an image creating processing wherein an image assembly, consisting of the initial image obtained by said image obtaining section per se or consisting of a reference image in which a predetermined image processing is applied to the initial image and a plurality of variation images in which image processing is applied to the initial image in accordance with an image processing condition wherein a parameter value of an adjustment parameter selected from a plurality of parameters is varied, taking as a reference a reference image processing condition for obtaining the reference image of image processing conditions defined by a set of parameter values of the plurality of parameters, is created for each of three or more sorts of adjustment parameters;

a display section for displaying the image assembly created by said image creating section;

a reference image set up section for setting up one of a plurality of images constituting a plurality of image assemblies displayed on said display section in form of a new reference image according to operation; and an image processing condition determining section for determining a reference image processing condition associated with the reference image finally set up by said reference image set up section in form of an image processing condition where the original image is subjected to the image processing, in accordance with operation, wherein said image creating section repeats said image creating processing, upon receipt of set up of the reference image, taking an image processing condition for creating a set up new reference image as a new reference image processing condition.

An operator uses the image processing condition determining apparatus of the present invention as mentioned above and sequentially renews strings of images and selects images in such a manner that while the operator looks at three or more sorts of strings of images displayed on the display section, the operator selects an image near one's favorite from a plurality of images constituting the full strings of images, and while the operator looks at a plurality of strings of images newly created taking the selected image as a new reference image, the operator selects an image nearer one's favorite. In this manner, the operator can reach an image associated with a desired image processing condition meeting one's favorite in short time, and decide the desired image processing condition as an image processing condition for the original image.

In the image processing condition determining apparatus according to the present invention as mentioned above, it is preferable that the image processing condition determining apparatus further comprises:

an image attribute designating section for designating an attribute of an image in accordance with an operation, and;

a parameter determining section for determining the adjustment parameter in accordance with the attribute designated by said image attribute designating section, wherein said image creating section creates the image assembly on the adjustment parameter determined by said parameter determining section.

Here, by way of example of attributes of images, there are raised highlight, skin, sky, green and brightness.

The use of the image processing condition determining apparatus makes it possible for an operator to readily obtain necessary adjustment parameters according to the attribute of the image. Thus, it is sufficient for the image processing condition determining apparatus of the present invention to simply deal with the necessary minimum adjustment parameters, and it is possible to readily determine the image processing condition for the original image in short time.

Further, in the image processing condition determining apparatus according to the present invention as mentioned above, it is preferable that said image creating section creates three or more image assemblies including at least two image assemblies in which a parameter value of a same adjustment parameter is varied with mutually different variation widths, instead of creating the image assembly for each of three or more sorts of adjustment parameters.

The use of the image processing condition determining apparatus of the present invention makes it possible for an operator to perform in parallel rough adjustment and fine adjustment with respect to the single adjustment parameter, for example, brightness. Thus, according to the image processing condition determining apparatus of the present invention, it is possible to readily perform a determination of image processing conditions for an original image in short time.

To achieve the above-mentioned object, the present invention provides an image processing image processing condition determining program storage medium storing an image processing condition determining program which causes a computer system to operate as an image processing condition determining apparatus when the image processing condition determining program is executed in the computer system, said image processing condition determining program comprising:

an image obtaining section for obtaining an initial image associated with the original image;

an image creating section for performing an image creating processing wherein an image assembly, consisting of the initial image obtained by said image obtaining section per se or consisting of a reference image in which a predetermined image processing is applied to the initial image and a plurality of variation images in which image processing is applied to the initial image in accordance with an image processing condition wherein a parameter value of an adjustment parameter selected from a plurality of parameters is varied, taking as a reference a reference image processing condition for obtaining the reference image of image processing conditions defined by a set of parameter values of the plurality of parameters, is created for each of three or more sorts of adjustment parameters;

a reference image set up section for setting up one of a plurality of images constituting a plurality of image assemblies created by said image creating section in form of a new reference image according to operation; and an image processing condition determining section for determining a reference image processing condition associated with the reference image finally set up by said reference image set up section in form of an image processing condition where the original image is subjected to the image processing, in accordance with operation, wherein said image creating section repeats said image creating processing, upon receipt of set up of the reference image, taking an image processing condition for creating a set up new reference image as a new reference image processing condition.

When the image processing condition determining program is executed in the computer system, the computer system serving as the image processing condition determining apparatus provides the same functional effects as the image processing condition determining apparatus of the present invention.

While the same names are applied to the structural elements in the image processing condition determining apparatus and the image processing condition determining program, the structural elements imply both the hardware and the software with respect to the image processing condition determining apparatus, and the structural elements imply only the software with respect to the image processing condition determining program.

DETAILED DESCRIPTION OF PREFERRED EMBODIMENTS

Embodiments of the present invention will be described with reference to the accompanying drawings.

Figure 1:
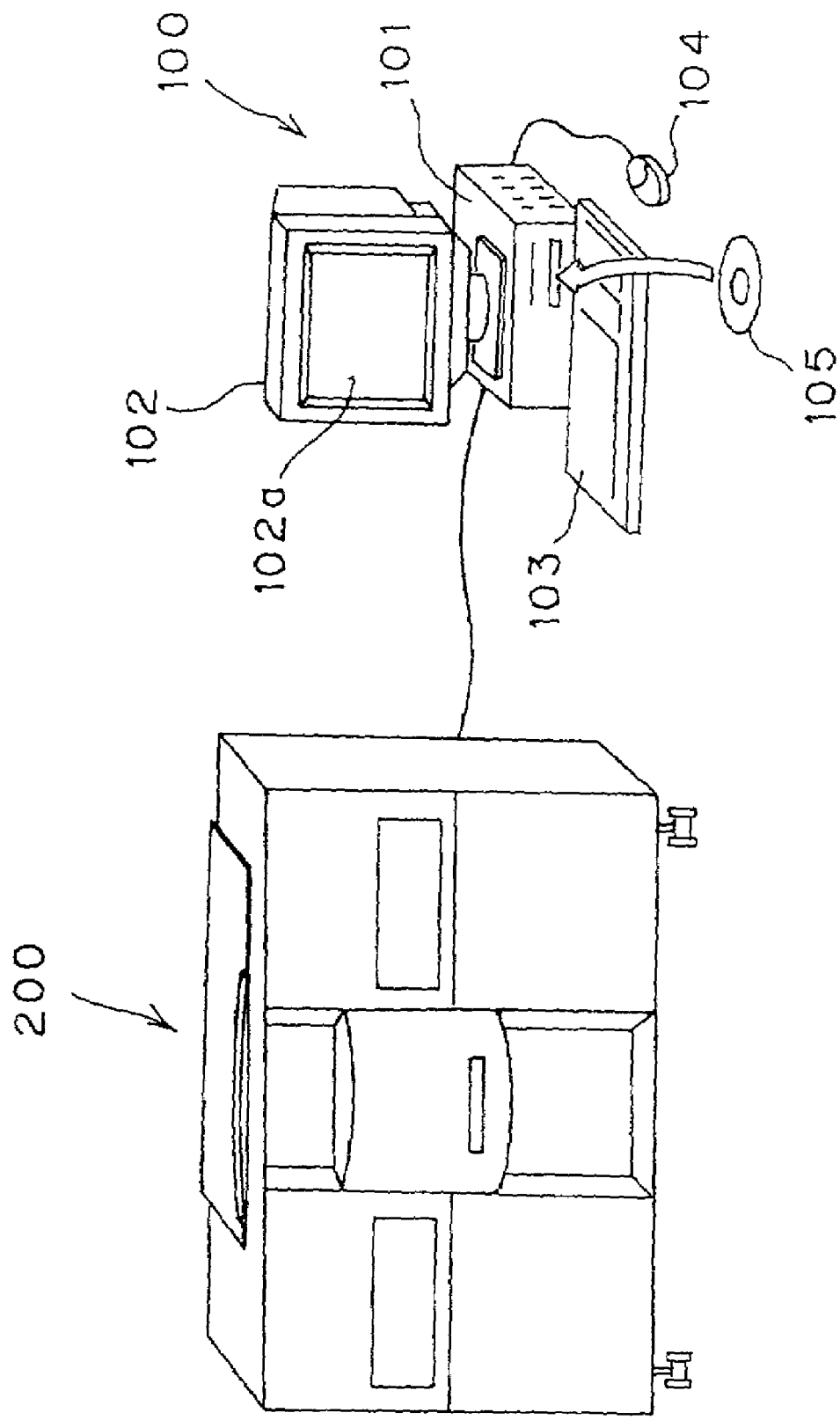
FIG. 1 is a view of an image processing system to which an image processing condition determining apparatus according to an embodiment of the present invention is applied.

FIG. 1 is a view of an image processing system to which an image processing condition determining apparatus according to an embodiment of the present invention is applied.

An image processing system shown in FIG. 1 comprises a computer system 100 for performing image processing for an input original image, and a scanner 200 for reading a predetermined document image to create an original image representative of a color image of CMY colors according to the document image.

Figure 2:
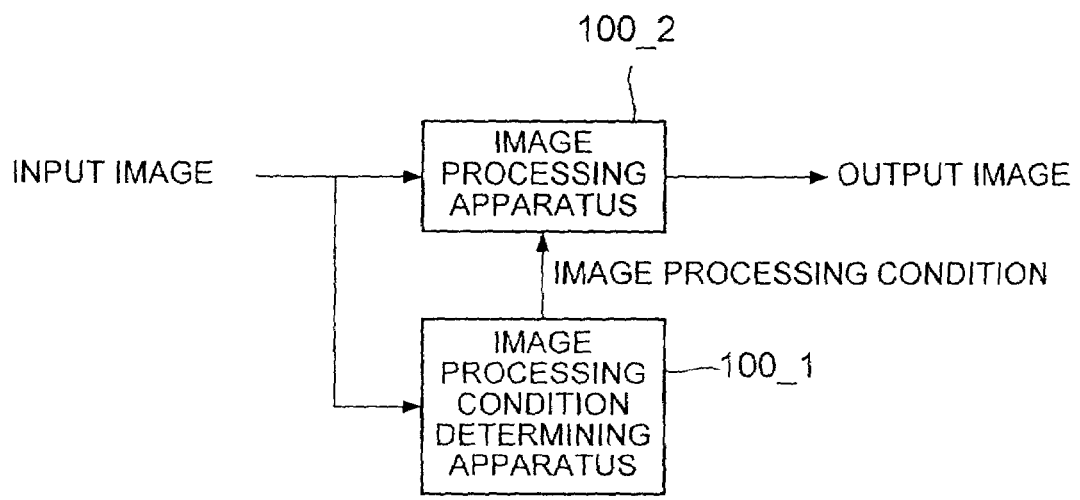
FIG. 2 is a schematic constitution view of a computer system.

FIG. 2 is a schematic constitution view of a computer system.

The computer system 100 shown in FIG. 1 comprises an image processing condition determining apparatus 100_1 and an image processing apparatus 100_2.

An original image created by the scanner 200 is fed to the image processing condition determining apparatus 100_1 and the image processing apparatus 100_2. The image processing apparatus 100_2 applies image processing to the input original image so that a good finish of image can be obtained with respect to the original image. The image processing is performed in accordance with an image processing condition indicating contents of the image processing.

The image processing condition is automatically computed by the image processing condition determining apparatus 100_1 in accordance with a result of analysis of the input original image by a predetermined program. The image processing condition thus obtained through the result of analysis is an image processing condition, which is decided as the optimum for the input original image in the algorithm of the program. However, it often happens that an image, which is subjected to image processing in accordance with the image processing condition thus decided, is one different from an operator's intended image, for example, it is slightly dark, or a green involved in the image processing is out of the operator's favorite green. On the other hand, according to the image processing condition determining apparatus 100_1 of the present embodiment, the image processing condition thus automatically computed is adjusted in accordance with the operation of an operator to determine a new image processing condition. Thus, as will be described hereinafter, the operator can readily decide a desired image processing condition in short time using the image processing condition determining apparatus 100_1 of the present embodiment.

Hereinafter, there will be described structure and operation of the computer system 100 with which the image processing condition determining apparatus 100_1 is implemented.

The computer system 100 comprises a main frame 101 incorporating therein a CPU, a main memory unit, hard disks, a communicating board, etc., a CRT display 102 for performing a display of an image plane and a string of characters on a display screen 102a in accordance with an instruction from the main frame 101, a keyboard 103 for inputting operator's instructions and character information to the computer system 100, and a mouse 104 for designating a desired position on the display screen 102a to input an instruction according to an icon or the like displayed on the designated position.

A CD-ROM 105 is detachably loaded on the main frame 101, which incorporates therein a CD-ROM drive for reproducing information stored in the loaded CD-ROM 105. Further, an MO (magneto-optical disk) 106 (not illustrated in FIG. 1) is detachably loaded on the main frame 101, which incorporates therein an MO drive for performing record and reproduction for information stored in the loaded MO 106.

A hardware structure of the computer system 100 is as follows.

Figure 3:
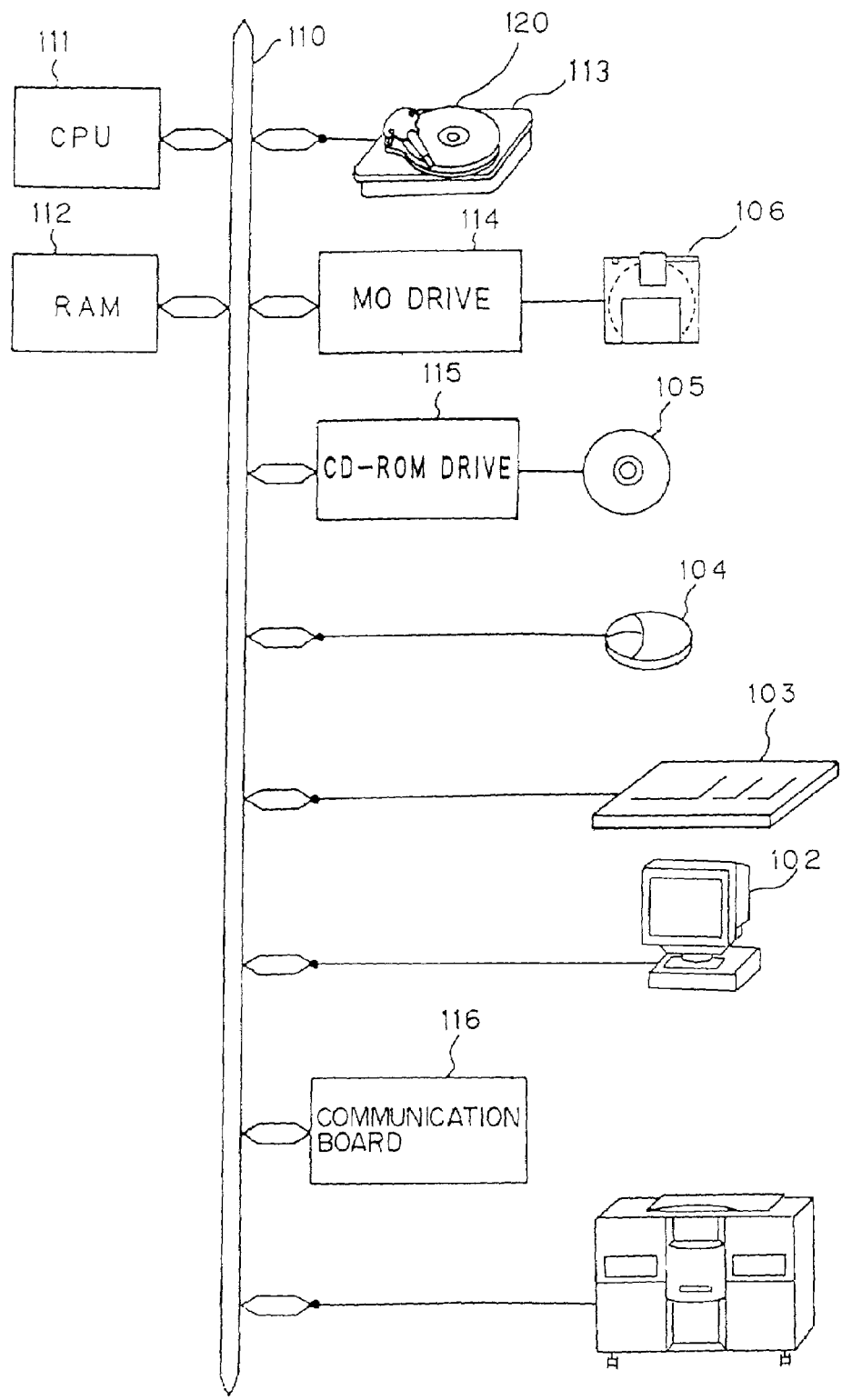
FIG. 3 is a hardware structural view of a computer system.

FIG. 3 is a hardware structural view of a computer system.

A computer system, as shown in FIG. 3, comprises a CPU (central processing unit) 111, a RAM 112, a HDD (hard disk drive) 113, an MO drive 114, a CD-ROM drive 115, and a communicating board 116. Those elements are connected to each other via a bus 110. The HDD 113 incorporates therein a hard disk 120 as a recording medium, and performs record and reproduction for information with respect to the hard disk 120.

A computer system, as shown in FIG. 3, further comprises the mouse 104, the keyboard 103, the CRT display 102 and a scanner 200, which are connected to the bus 110 via a plurality of I/O interfaces (not illustrated in FIG. 1).

Figure 4:
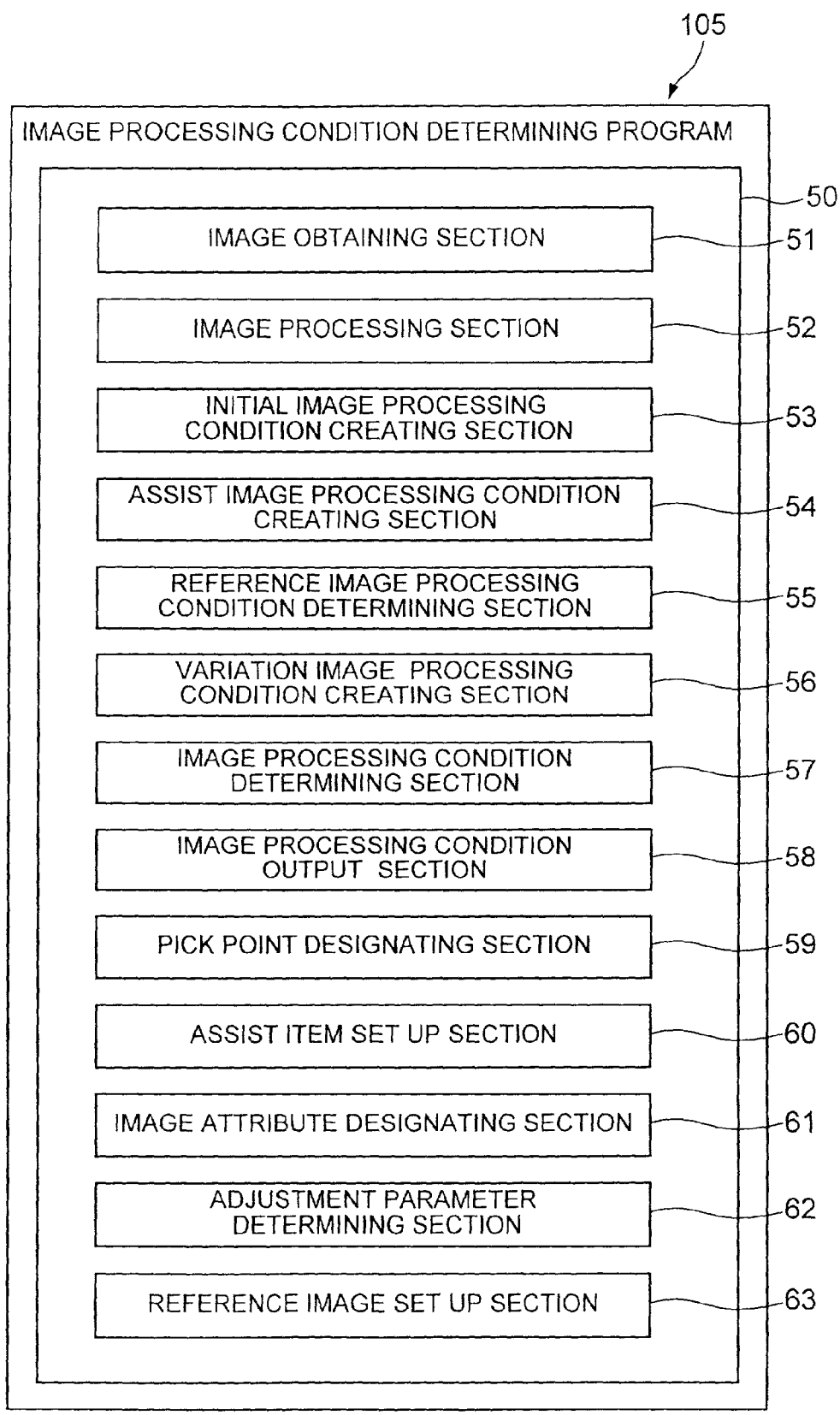
FIG. 4 is a view showing an embodiment of an image processing condition determining program storage medium according to the present invention.

FIG. 4 is a view showing an embodiment of an image processing condition determining program storage medium according to the present invention.

According to the present embodiment, the CD-ROM 105 stores an image processing condition determining program referred to in the present invention. The CD-ROM 105, which stores the image processing condition determination program, corresponds to an embodiment of an image processing condition determining program storage medium of the present invention.

An image processing condition determining program 50 stored in the CD-ROM 105 shown in FIG. 4 includes, as a software, an image obtaining section 51, an image processing section 52, an initial image processing condition creating section 53, an assist image processing condition creating section 54, a reference image processing condition determining section 55, a variation image processing condition creating section 56, an image processing condition determining section 57, an image processing condition output section 58, a pick point designating section 59, an assist item set up section 60, an image attribute designating section 61, an adjustment parameter determining section 62, and a reference image set up section 63. According to the present embodiment, a portion corresponding to an image creating section referred to in the image processing condition determining program storage medium of the present invention comprises the reference image processing condition determining section 55, the variation image processing condition creating section 56, and the image processing section 52.

The CD-ROM 105 is loaded onto the main frame 101 so that the CD-ROM drive 115 reads the image processing condition determining program 50 stored in the CD-ROM 105 to be installed in the hard disk 120 via the bus 110.

When the image processing condition determining program 50 installed in the hard disk 120 starts, the image processing condition determining program 50 in the hard disk 120 is loaded onto the RAM 112 and is executed by the CPU 111. That is, on the computer system 100, the image processing condition determining apparatus 100_1, which comprises both a software and a hardware as environments to operate the software, is implemented with a structure shown in FIG. 5. The structural elements constituting the image processing condition determining apparatus 100_1 shown in FIG. 5 correspond to the same name of elements as the soft ware as mentioned above.

The image processing condition determining program 50 stored in the CD-ROM 105 is installed in the hard disk of the computer system 100 in the manner as mentioned above. In this case, the hard disk, which is in a state that the image processing condition determining program is installed, corresponds to an embodiment of an image processing condition determining program storage medium of the present invention, too.

Further, in the computer system 100 shown in FIG. 1, as a program storage medium storing an image processing condition determining program, the CD-ROM 105 is used. It is noted, however, that the medium storing the program referred to in the present invention is not restricted to the CD-ROM, but it is acceptable that recording media such as an optical disk, a MO (magneto-optical disk), a floppy disk, and a magnetic tape are used other than the CD-ROM. The program storage medium, which is in a state that an image processing condition determining program is stored, corresponds to an embodiment of an image processing condition determining program storage medium of the present invention.

Hereinafter, there will be described structure and operation of the image processing condition determining apparatus 100_1 which is implemented on the computer system 100.

Figure 5:
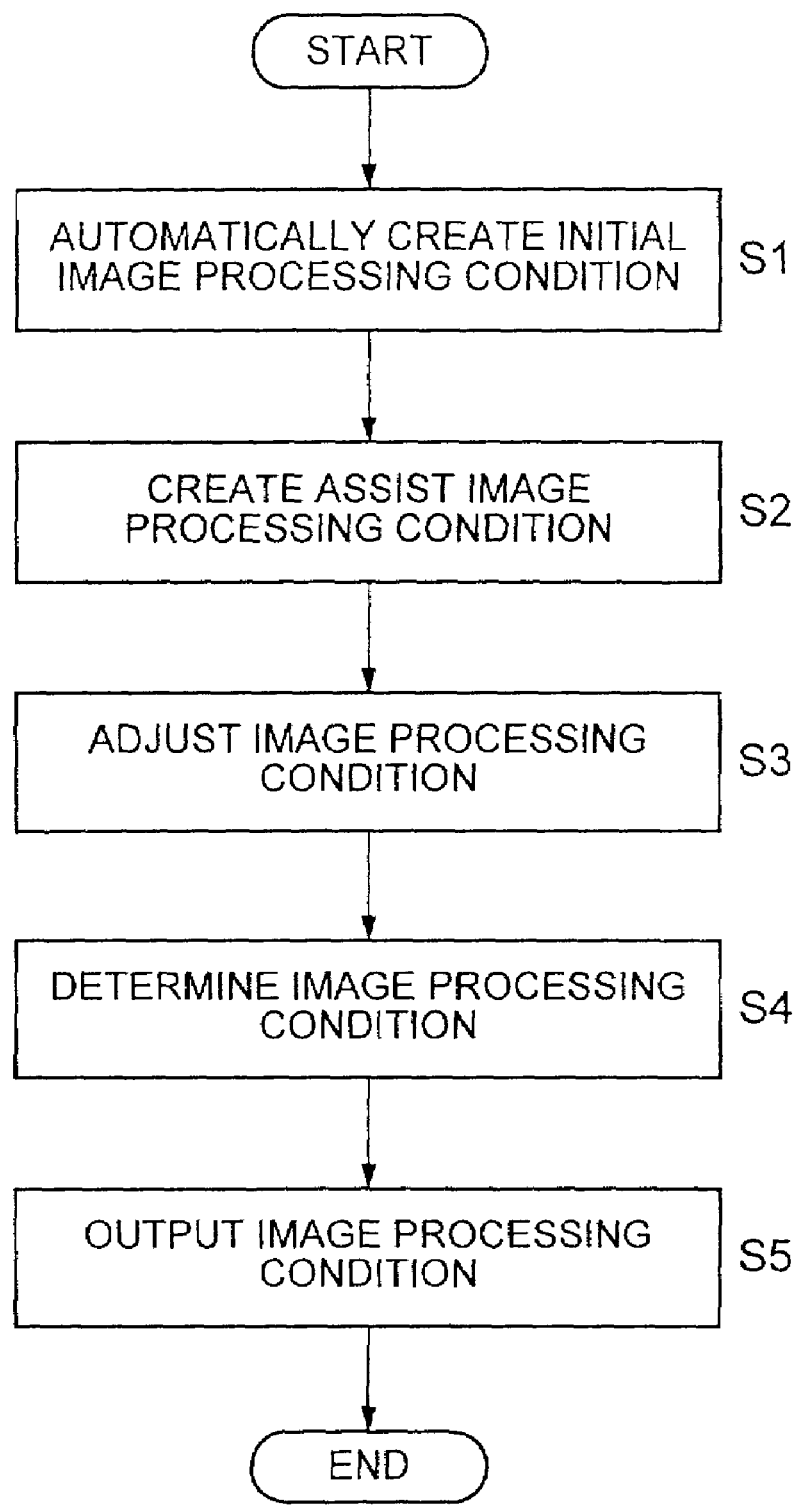
FIG. 5 is a flowchart useful for understanding an operation of an image processing condition determining apparatus according to an embodiment of the present invention, which is shown in FIG. 2.

FIG. 5 is a flowchart useful for understanding an operation of an image processing condition determining apparatus according to an embodiment of the present invention, which is shown in FIG. 2.

The image processing condition determining apparatus 100_1 operates in a manner as shown in steps S1 to S5 set forth below.

In the step S1, an automatic creation of an initial image processing condition, in which image processing conditions for the image processing apparatus 100_2 are automatically computed and created, is performed. Next, the process goes to the step S2.

In the step S2, the initial image processing condition created in the step S1 is altered in accordance with an operation of an operator to perform an assist image processing condition creation for creating a new image processing condition (an assist image processing condition) in such a manner that a point designated on an image which is subjected to an image processing in accordance with the initial image processing condition.

In the step S3, there is performed an image processing condition adjustment in which the image processing conditions created in the steps S1 and S2 are adjusted to create new image processing conditions. Incidentally, it is noted that the steps S2 and S3 can be repeatedly performed regardless of the order. Further, it is acceptable that either or both of the steps S2 and S3 is not performed. After the steps S2 and S3, the process goes to the step S4.

In the step S4, the image processing conditions created in the steps S1, S2 and S3 are decided in form of the image processing conditions for the image processing apparatus 100_2. Next, the process goes to the step S5.

In the step S5, the image processing condition decided in the step S4 is outputted to the image processing apparatus 100_2. The image processing condition thus outputted is set up onto the image processing apparatus 100_2.

There will be described a structure of an image processing condition determining apparatus according to the present embodiment, which perform the above-described operation, in conjunction with FIG. 6, and then will be described in detail the operation of the flowchart of FIG. 5.

Figure 6:
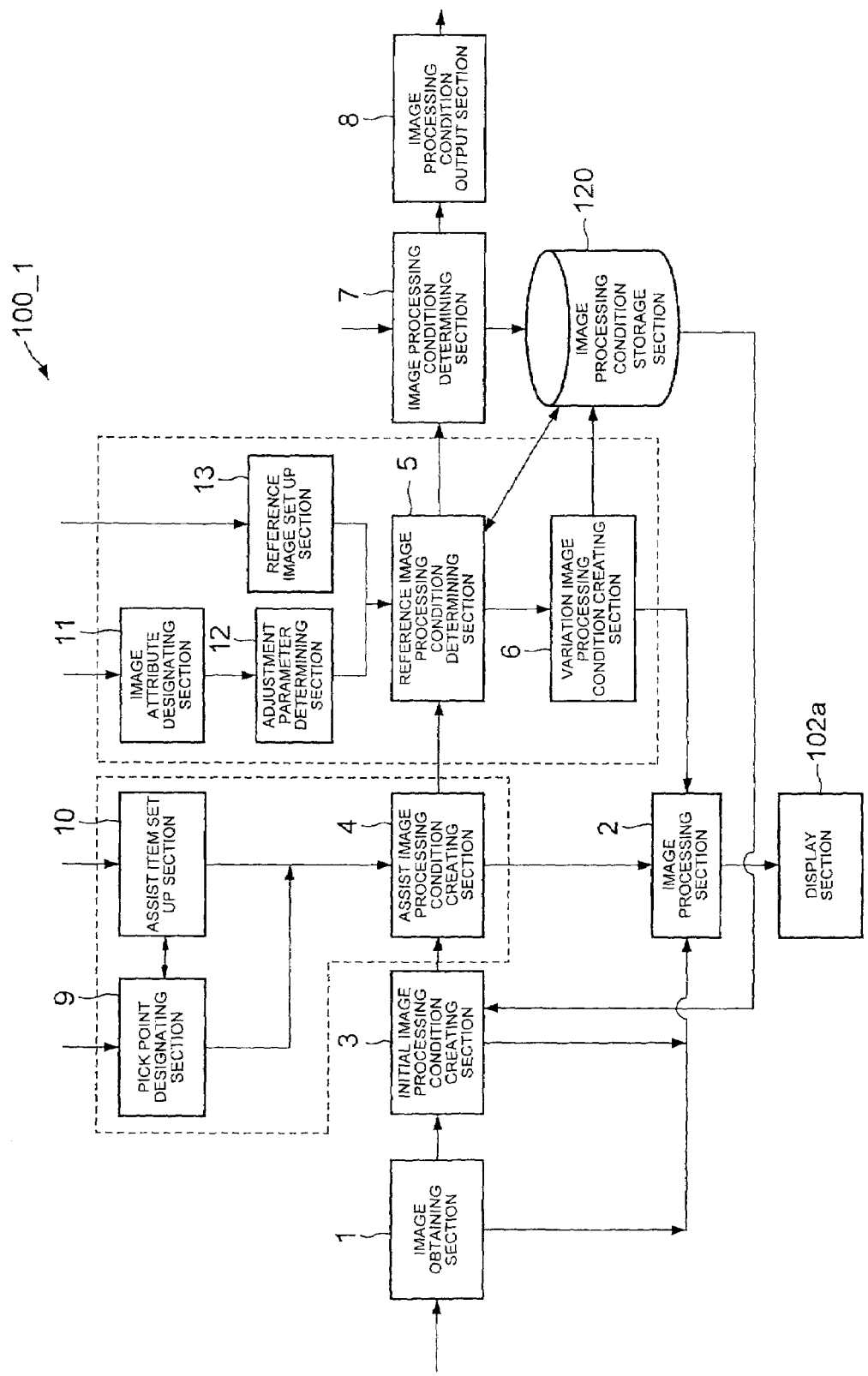
FIG. 6 is a schematic constitution view of an image processing condition determining apparatus according to an embodiment of the present invention, which is shown in FIG. 2.

FIG. 6 is a schematic constitution view of an image processing condition determining apparatus according to an embodiment of the present invention, which is shown in FIG. 2.

As shown in FIG. 6, the image processing condition determining apparatus 100_1, which is implemented on the computer system 100, comprises an image obtaining section 1, an image processing section 2, a display section 102a, an image processing condition determining section 7, an image processing condition output section 8, and an image processing condition storage section 120.

The image obtaining section 1 is for obtaining an initial image that is an image based on an original image or information amount of the original image.

The image processing section 2 receives the initial image obtained by the image obtaining section 1, and receives image processing conditions determined and created by an initial image processing condition creating section 3, an assist image processing condition creating section 4, a reference image processing condition determining section 5, and a variation image processing condition creating section 6, which will be described later, so that the received initial image is subjected to an image processing in accordance with the received image processing conditions.

The display section 102a displays the image subjected to the image processing by the image processing section 2.

The image processing condition determining section 7 determines a certain image processing condition from among the image processing conditions determined and created by an initial image processing condition creating section 3, an assist image processing condition creating section 4, a reference image processing condition determining section 5, and a variation image processing condition creating section 6, which will be described later, as an image processing condition for use in the image processing apparatus 100_2 in accordance with an operation of an operator.

The image processing condition output section 8 outputs the image processing condition determined by the image processing condition determining section 7 to the image processing apparatus 100_2.

The image processing condition storage section 120 stores the image processing condition determined by the image processing condition determining section 7, and also stores a reference image processing condition determined by a reference image processing condition determining section 5 and a variation image processing condition created by a variation image processing condition creating section 6, which will be described later.

The image processing condition determining apparatus 100_1 of the present embodiment further comprises a pick point designating section 9, an assist item set up section 10 and an assist image processing condition creating section 4, which are used for creation of assist image processing conditions.

The pick point designating section 9 designates points (pick points) on an image displayed on an image display window of the display unit 102a in accordance with an operation of an operator.

The assist item set up section 10 sets up a state of color of the pick point designated by the pick point designating section 9 in accordance with an operation of an operator. In the assist item set up section 10, there are previously determined, for example, colors of skin, for which many persons would feel beautiful, and it is possible to set up the colors thus determined beforehand.

The assist image processing condition creating section 4 creates a new image processing condition in which a color of the pick point designated by the pick point designating section 9 is altered to a state of color set up by the assist item set up section 10.

The image processing condition determining apparatus 100_1 of the present embodiment further comprises an image attribute designating section 11, an adjustment parameter determining section 12, a reference image set up section 13, a reference image processing condition determining section 5, and a variation image processing condition creating section 6, which are used for an image processing condition adjustment. According to the present embodiment, a portion corresponding to the image creating section referred to in the image processing condition determining apparatus of the present invention comprises the reference image processing condition determining section 5, the variation image processing condition creating section 6 and the image processing section 2.

According to the present embodiment, the image processing condition is defined by a set of parameter values of a plurality of parameters. Hereinafter, a parameter used in the image processing condition adjustment in the step S3 is referred to as an adjustment parameter.

The image attribute designating section 11 designates an attribute of an image, such as highlights, the sky, the skin and the brightness, in accordance with an operation of an operator.

The adjustment parameter determining section 12 determines an adjustment parameter according to the attribute designated by the image attribute designating section 11.

The reference image processing condition determining section 5 determines a reference image processing condition associated with a reference image, which is a reference in an image processing condition adjustment, in accordance with an operation of an operator. According to the image processing condition adjustment in the step S3, the reference image processing condition may be repeatedly renewed. For example, the first reference image processing condition determined by the reference image processing condition determining section 5 becomes the initial image processing condition created by the initial image processing condition creating section 3, or the assist image processing condition created by the assist image processing condition creating section 4. The reference image processing condition determined by the reference image processing condition determining section 5 is stored in the image processing condition storage section 120.

The variation image processing condition creating section 6 creates variation image processing conditions, wherein a parameter value of one adjustment parameter selected from among a plurality of parameters is varied on the basis of the reference image processing condition determined by the reference image processing condition determining section 5 with respect to the initial image, on each of at least three sorts of adjustment parameters. All the variation image processing conditions created by the variation image processing condition creating section 6 are stored in the image processing condition storage section 120.

Hereinafter, an image, which is created in such a manner that the initial image is subjected to image processing in accordance with the reference image processing condition determined by the reference image processing condition determining section 5, is a reference image. An image, which is created in such a manner that the initial image is subjected to image processing in accordance with the variation image processing conditions created by the variation image processing condition creating section 6. Further, hereinafter, an assembly of the reference image and a plurality of variation images created on a sort of adjustment parameter is referred to as a string of images. The string of images corresponds to the image assembly referred to in the present invention.

The image processing section 2 applies an image processing to the initial image in accordance with the reference image processing condition determined by the reference image processing condition determining section 5, and applies an image processing to the initial image in accordance with the variation image processing conditions created by the variation image processing condition creating section 6, so that a string of images is created on each of at least three sorts of adjustment parameters. A plurality of string of images created by the image processing section 2 is displayed on the display unit 102a.

The reference image set up section 13 sets up, in the event that the plurality of string of images is displayed on the display unit 102a, one of a plurality of images constituting the plurality of string of images displayed on the display unit 102a as a reference image in accordance with an operation of an operator.

The reference image processing condition determining section 5 reads from the image processing condition storage section 120 the image processing condition corresponding to the reference image set up by the reference image set up section 13, and determines the image processing condition thus read as a new reference image processing condition.

As will be described in detail later, in the image processing condition adjustment in the step S3, there is repeated such a process that the variation image processing condition creating section 6 creates the variation images, a plurality of string of images created through an image processing by the image processing section 2 is created, the created string of images is displayed on the display section 102a, the reference image set up section 13 sets up an image from among a plurality of images constituting the displayed string of images, and the reference image processing condition determining section 5 determines the reference image processing condition.

Next, there will be described details of the steps S1 to S3, which will be implemented by the image processing condition determining apparatus 100_1 of the present embodiment.

Figure 7:
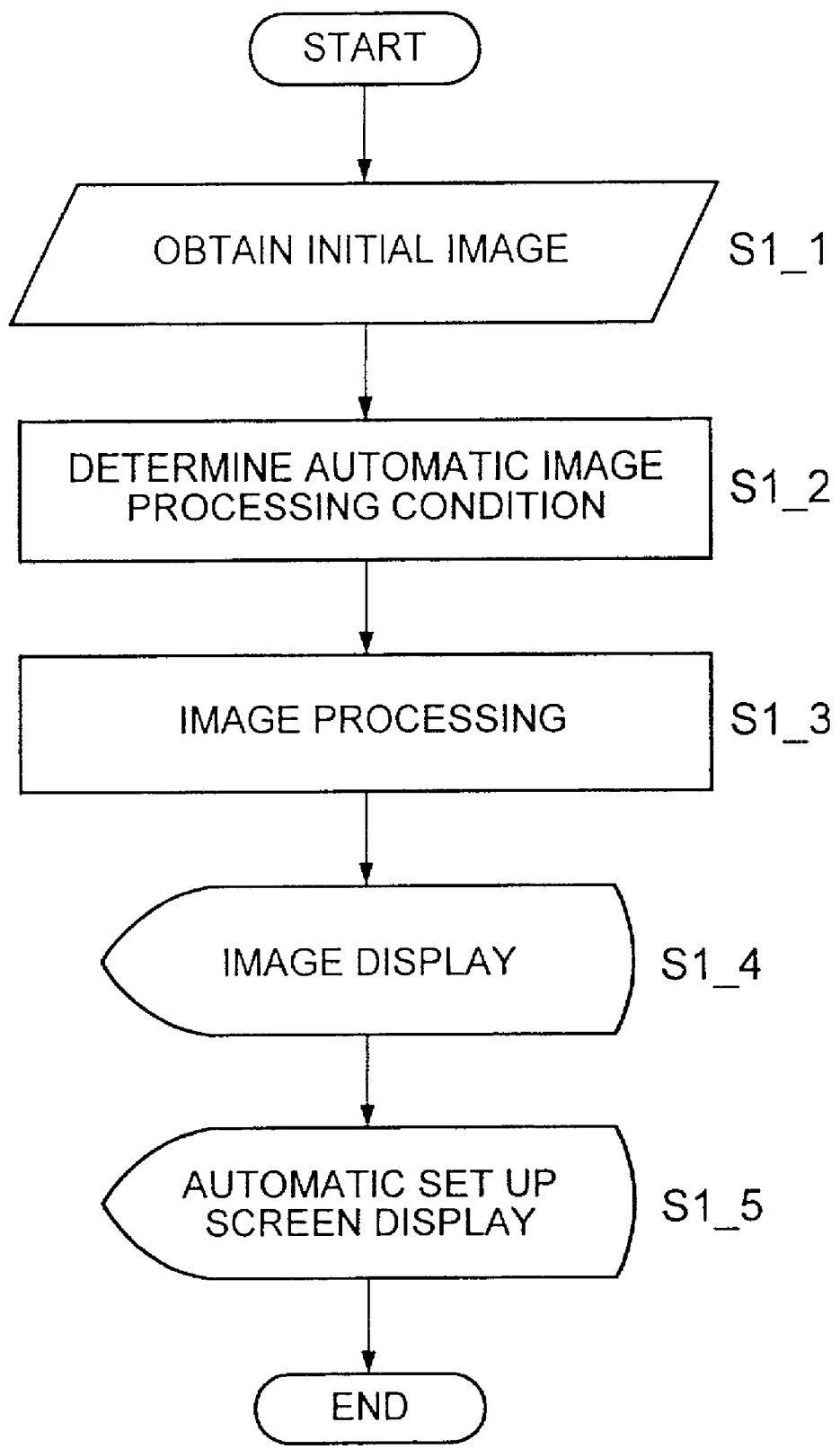
FIG. 7 is a flowchart useful for understanding an operation of an image processing condition determining apparatus according to an embodiment of the present invention with respect to an image processing condition automatic creation.

An image processing condition automatic creation in the step S1 is carried out in accordance with a flowchart shown in FIG. 7.

FIG. 7 is a flowchart useful for understanding an operation of an image processing condition determining apparatus according to an embodiment of the present invention with respect to an image processing condition automatic creation.

In a step S1_1, the image obtaining section 1 obtains the initial image. Next, the process goes to a step S1_2.

In the step S1_2, the initial image obtained by the image obtaining section 1 is transferred to the initial image processing condition creating section 3 to analyze the initial image. The initial image processing condition creating section 3 creates an initial image processing condition that is decided as the optimum for the initial image as a result of the analysis. Next, the process goes to a step S1_3.

In the step S1_3, the initial image obtained by the image obtaining section 1 and the initial image processing condition created by the initial image processing condition creating section 3 are transferred to the image processing section 2 so that the initial image is subjected to image processing in accordance with the initial image processing condition created by the initial image processing condition creating section 3. Next, the process goes to a step S1_4.

In the step S1_4, the image, which has been subjected to the image processing by the image processing section 2, is displayed in the image display window on the display screen 102a. An operator is able to confirm the image displayed in the image display window. Next, the process goes to a step S1_5.

In the step S1_5, an automatic set up window, different from the image display window, is displayed on the display screen 102a.

Figure 8:
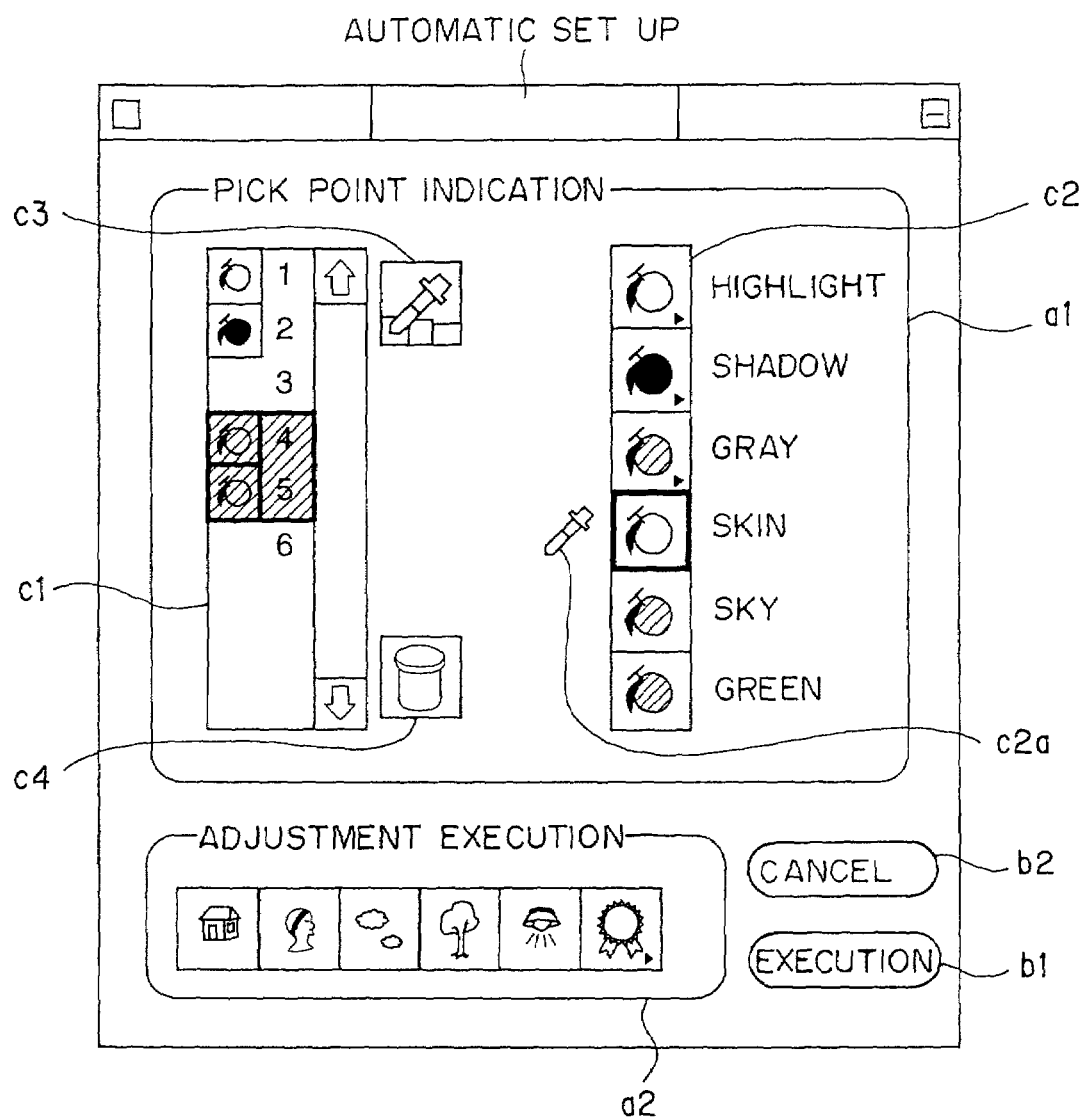
FIG. 8 is a view showing an automatic set up window.

FIG. 8 is a view showing an automatic set up window.

On the automatic set up window shown in FIG. 8, there exist a pick point indication area a1 in which buttons used when an assist image processing condition creation is performed in the step S2 are arranged, an adjustment execution area a2 in which a plurality of buttons used for transition to an image processing condition adjustment to be carried out in the step S3 are arranged, an execution button b1 and a cancel button b2.

The execution button b1 is to make, when it is clicked by the mouse, such a decision that the image processing condition created in the steps 1 to 3 is established as the image processing condition used in the image processing apparatus 100_2. That is, the step S4 for making a decision of the image processing condition is initiated by a click of the execution button b1.

When the execution button b1 is clicked at the stage of the step S1_5, the assist image processing condition creation in the step S2 and the image processing condition adjustment in the step S3 are skipped, and the initial image processing condition automatically computed in the step S1_2 is decided as the image processing condition for the image processing apparatus 100_2.

Next, there will be described details of the assist image processing condition creation in the step S2. In the assist image processing condition creation in the step S2, an operator would use mainly the pick point indication area a1, and thus, first, there will be described the pick point indication area a1.

As shown in FIG. 8, in the pick point indication area a1, there exist a pick point list c1, an assist item button group c2, a sample pick button c3 and a delete button c4.

The pick point list c1 is a list for all the pick points designated by the pick point designating section 9 in accordance with a pointer operation by an operator on the image display window. Numerals on the list are numerals for discriminating pick points, applied to the pick points. Mini-icons displayed left side of the numerals denote color states set up, using buttons of the assist item button group c2, which will be described latter, for the pick points represented by the numerals. Incidentally, as the pick point of the numeral 3, one in which no mini-icon is displayed in the pick point list c1, denotes that a color state is not yet established.

As shown in FIG. 8, in the pick point list c1, portions representative of pick points of the numerals 4 and 5 are enhanced by thick frames and oblique lines. The pick points thus enhanced are pick points that are in the selected state. The assist image processing condition creation in the step S2 is performed for the pick points that are in the selected state.

The selected state and the non-selected state are alternately changed by clicking portions associated with the pick points of the pick point list c1. In the event that the clicked portion is involved in the non-selected state at the time of clicking, if there is anyone involved in the selected state with respect to portions other than the clicked portion, it is either permitted that the portion involved in the selected state is retained as it is in the selected state or changed to one involved in the non-selected state, in accordance with an operation.

The assist item button group c2 is a set of buttons associated with assist items such as "highlight", "shadow", "gray", "skin", "sky", and "green". A "highlight" button is for performing an establishment of making even intensity of YMC colors of the highlight area with respect to the pick point. A "shadow" button and a "gray" button are for performing an establishment of making even intensity of YMC colors of the shadow area and the gray area with respect to the pick points, respectively.

A "skin" button, a "sky" button, and a "green" button are for setting up a color of the skin, a color of the sky and a color of the green, with which the general person feels beautiful, with respect to the pick points, respectively. Incidentally, of the buttons of the assist item button group c2, ones displayed with thick frames indicate that the assist items associated with the buttons displayed with thick frames are in the selected state.

The states of colors associated with the assist items are defined by a combination of dot% of CMYK colors. In the event that the assist item is established on the pick point of the pick point list c1, there appears on the display screen 102a a sample pick window for displaying information of the combination of the dot% of CMYK colors with respect to the pick point, in accordance with an operation of an operator. Thus, the operator can confirm the state of color of the pick point by the sample pick window, and also can alter the state of color of the pick point.

The sample pick button c3 is for changing over between a sample pick mode and a non-sample pick mode which will be described later. When operator clicks the sample pick button c3, the sample pick mode is selected.

The image display window is provided with a toolbox which has a sample pick button having the same function as the sample pick button c3.

When the delete button c4 is clicked, a portion representative of a pick point in a state of selection on the pick point list c1 is deleted from the pick point list, and the pick point associated with the portion is deleted from an image displayed on the image display window.

The image processing condition determining apparatus 100_1 of the present embodiment performs an assist image processing condition creation in a manner as set forth below in accordance with a pointer operation on the image display window and operations of the buttons on the automatic set up window as mentioned above.

Figure 9:
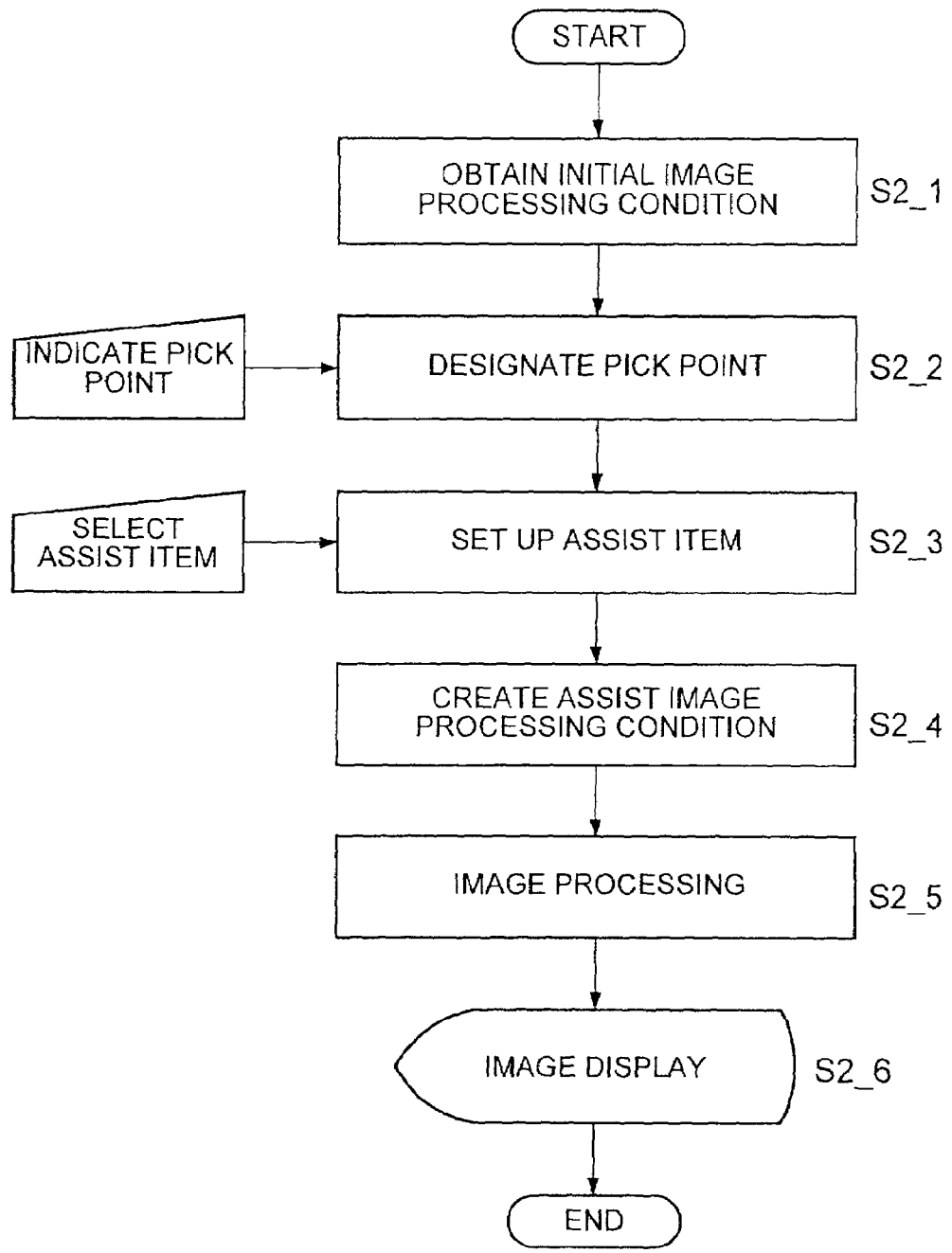
FIG. 9 is a flowchart useful for understanding an operation of an image processing condition determining apparatus according to an embodiment of the present invention with respect to an assist image processing condition creation.

FIG. 9 is a flowchart useful for understanding an operation of an image processing condition determining apparatus according to an embodiment of the present invention with respect to an assist image processing condition creation.

In a step S2_1, the assist image processing condition creating section 4 obtains the initial image processing condition created by the initial image processing condition creating section 3 in the step S1_2. Next, the process goes to a step S2_2.

In the step S2_2, the pick point designation section 9 designates a position of the respective pick point on an image of the image display window in accordance with a pointer operation of an operator. Next, the process goes to a step S2_3.

In the step S2_3, the assist item set up section 10 sets up the assist items for the pick points designated in the step S2_2 in accordance with a click operation of a button of the assist item button group c2 by an operator so that the association of the pick points with the assist items is performed. Next, the process goes to a step S2_4.

In the step S2_4, the assist image processing condition creating section 4 obtains the initial image processing condition created by the initial image processing condition creating section 3 and in addition the pick points designated by the pick point designating section 9 and the assist items for the pick points set up by the assist item set up section 10, and creates an assist image processing condition in which the obtained initial image processing condition is altered to satisfy the assist items set up for the pick points in the state of selection of the obtained pick points. Next, the process goes to a step S2_5.

In the step S2_5, the image processing section 2 obtains the initial image from the image obtaining section 1 and in addition the assist image processing condition created by the assist image processing condition creating section 4, and performs an image processing for the obtained initial image in accordance with the obtained assist image processing condition. Next, the process goes to a step S2_6.

In the step S2_6, the image, which is subjected to the image processing by the image processing section 2 in the step S2_5, is displayed on the image display window of the display screen 102a.

The pick point designation in the step S2_2 and the assist item set up in the step S2_3 are suitably performed in accordance with operation of an operator. The operator can repeatedly perform designations of the pick points and selections of the assist items, while looking images displayed in the step S2_6.

Next, there will be described more details of the pick point designation in the step S2_2 and the assist item set up in the step S2_3.

The pick point designation in the step S2_2 is initiated, for example, in such a manner that an operator clicks the sample pick button to establish the sample pick mode. In the sample pick mode, a plurality of points of an image displayed on the image display window is picked up in form of a pick point to be used for the assist image processing condition creation in accordance with an operation of a pointer on the image display window by the operator. The picked up pick points on the image are applied with numerals, respectively. Further, the picked up pick points are added to the pick point list c1 together with numerals.

When the picked up pick point is set up to the selected state and a button involved in the non-selected state of the assist item button group c2 is clicked, as will be described later, the assist item associated with the clicked button is in the selected state so that the assist item is set up for the pick point. In this case, a dropper mark is displayed at the left side of the clicked button. In a state that the dropper mark is displayed, when a new pick point is picked up into the image on the image display window, the assist item of the button displayed with the dropper mark is set up on the new pick point at the same time as the picking up.

The sample pick button c3 serves to remove the set up of the assist item. When the sample pick button c3 is clicked, the dropper mark disappears and thus it is possible to pick up the pick point in a state free from the association with the assist item.

In the event that there exists a portion representative of a pick point in the selected state on the pick point list, when the sample pick button c3 is clicked, picking up the pick point associated with the portion from the image on the image display window makes it possible to alter the pick point associated with the portion. In the event that the assist item is set up on the portion before clicking of the sample pick button c3, clicking of the sample pick button c3 releases the set up.

Next, there will be described details of the assist item set up in the step S2_3.

When the assist item button involved in the non-selected state is clicked, the clicked button offers the selected state, and is displayed with a thick frame. If there exists a pick point involved in the selected state on the pick point list, the assist item of the button is set up on the pick point. For example, FIG. 8 shows a state that the assist item button of the "skin" is clicked, so that the assist item of the "skin" is set up on both the pick points of numerals 4 and 5 in the selected state of the pick point list c1.

In the event that there exists no pick point involved in the selected state on the pick point list c1, if there exists a pick point wherein the same assist item as the clicked assist item, in the pick point list, the pick point offers the selected state.

When the assist item button involved in the non-selected state is clicked, a dropper mark is displayed at the left side of the clicked button. In the event that there exists any assist item button involving a display of the dropper mark other than the clicked assist item button, the dropper mark displayed at the left side of the buttons other than the clicked assist item button disappears.

On the other hand, when the assist item button involved in the selected state is clicked, in some case, the assist item button offers the non-selected state. For example, in the event that there exists no pick point involved in the selected state on the pick point list c1, or in the event that even if there exists a pick point involved in the selected state on the pick point list c1, the pick point is associated with one wherein the assist item of the clicked button is set up, when the assist item button involved in the selected state is clicked, the assist item button offers the non-selected state.

To the contrary, in the event that there exists a pick point in which an assist item different from the clicked assist item is set up, on the pick point list c1, when the assist item button involved in the selected state is clicked, the assist item button retains the selected state, and an assist item of the clicked button is newly set up at the pick point.

For example, in the event that both the pick points of numerals 4 and 5 in the selected state of the pick point list c1 are involved in one in which the assist item of the "highlight" is set up, different from FIG. 8, when the assist item button of the "skin" in the selected state is, both the pick points of numerals 4 and 5 of the pick point list c1 are set up to the assist item of the "skin". The assist item button of the "skin" retains the selected state.

In the event that an assist item button in the selected state is clicked, so that the associated assist item offers the non-selected state, if a dropper mark is displayed at the side of the assist item button to be clicked, the dropper mark disappears. In this case, the set up of the assist item for the pick point is not affected by clicking of the assist item button.

In the event that an assist item button in the selected state is clicked, so that the associated assist item retains the selected state, a dropper mark is displayed at the left side of the clicked button, and if a dropper mark is displayed at the side of any assist item button other than the clicked button, the dropper mark disappears.

It is permitted that a plurality of assist item buttons is maintained in the selected state. But it is not permitted that the assist item buttons for the "gray" and the "skin" are simultaneously set up into the selected state. When one of the assist item buttons for the "gray" and the "skin" is set up into the selected state, another is automatically set up into the non-selected state.

When the assist item buttons for the "highlight", the "shadow" and the "gray" are continued to be depressed over a certain time through an operation of the mouse, pop-up windows appear on the respective assist item buttons.

Figure 10:
FIG. 10 is a view showing pop-up windows appearing on assist item buttons.

FIG. 10 is a view showing pop-up windows appearing on assist item buttons.

FIG. 10 shows assist item buttons for the "highlight", the "shadow" and the "gray", and pop-up windows appearing on the assist item buttons. Pop-up windows each displaying choices of "beautifully/slightly beautifully" appear on the assist item buttons for the "highlight" and "shadow". A pop-up window displaying choices of "make it even/bring it close" appear on the assist item buttons for the "gray". Thus, an operator can select a desired item from those pop-up windows. When the "beautifully" and "make it even" are selected from the pop-up windows, the pick points, in which assist items of the buttons on which the pop-up windows appear is set up, offer such a state of color that intensities of YMC colors in original colors of the pick points are completely made even. When the "slightly beautifully" and "bring it close" are selected from the pop-up windows, the pick points, in which assist items of the buttons on which the pop-up windows appear is set up, offer a state of color which is an intermediate state between a state of original colors of the pick points and a state of color in which intensities of YMC colors of the pick points are made even.

As mentioned above, an operator can repeat the designation of pick points in the step S2_2 and the set up of assist items in the step S2_3, while looking an image displayed on the image display window. In the step S2_4, the assist image processing condition creating section 4 creates the assist image processing condition in accordance with the assist items set up for the pick points in the selected state.

Thus, after the creation of the assist image processing condition in the step S2_4 of the step S2, when an operator clicks the execution button b1, the process skips the step S3 in the flowchart shown in FIG. 5 and goes to the step S4 in which the image processing condition determining section 7 determines the assist image processing condition as an image processing condition applied to the image processing apparatus 100_2.

Alternatively, in the situation that the assist image processing condition is created in the manner as mentioned above, when an operator clicks any one of a plurality of adjustment execution buttons (which will be described latter) in the adjustment execution area a2, the process goes to the step S3 in which the image processing condition adjustment is initiated to perform an adjustment of the created assist image processing condition.

Next, there will be described details of the adjustment of the assist image processing condition.

Figure 11:
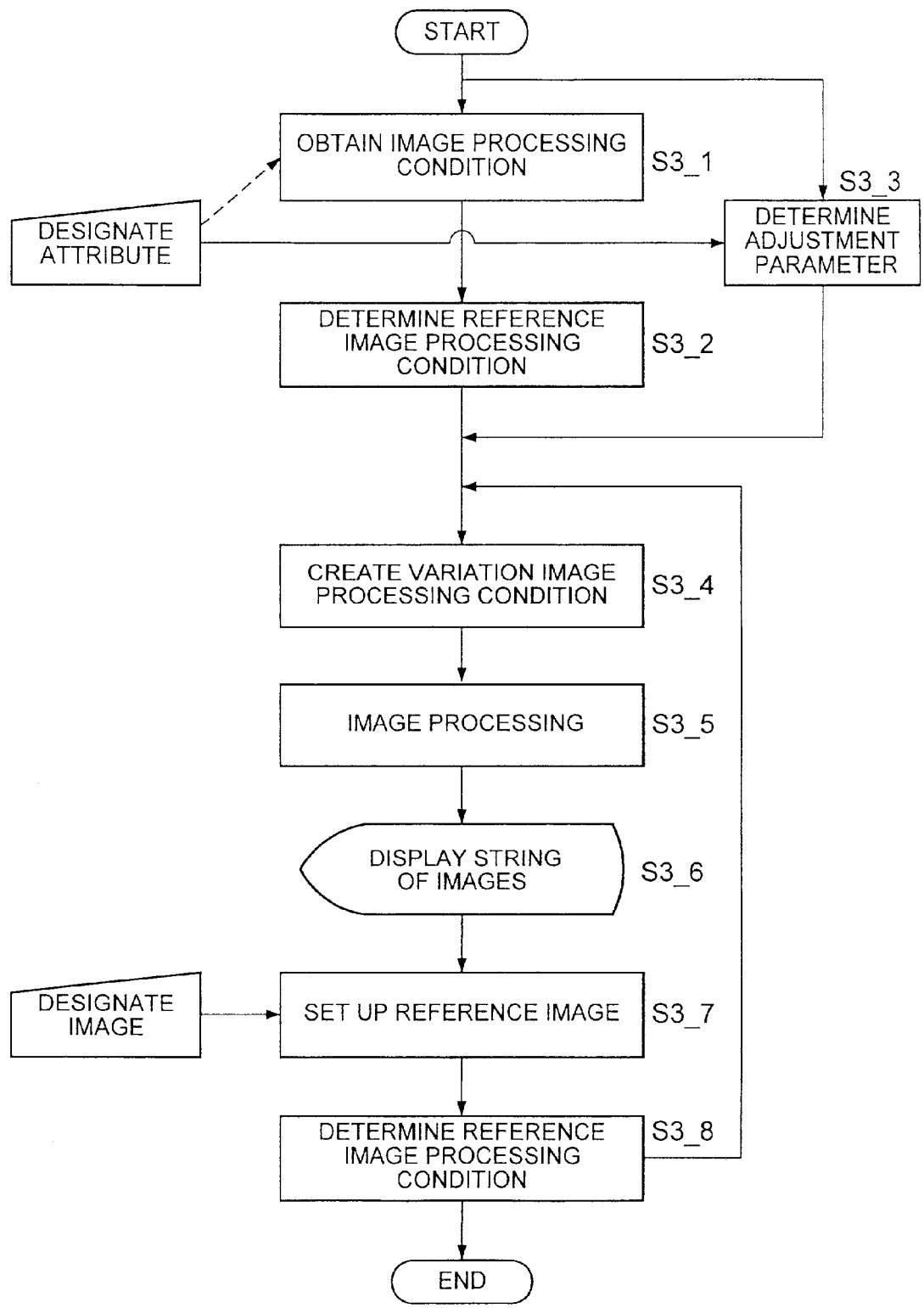
FIG. 11 is a flowchart useful for understanding an operation of an image processing condition determining apparatus according to an embodiment of the present invention with respect to an image processing condition adjustment.

FIG. 11 is a flowchart useful for understanding an operation of an image processing condition determining apparatus according to an embodiment of the present invention with respect to an image processing condition adjustment.

In a step S3_1, the reference image processing condition determining section 5 obtains the assist image processing condition created by the assist image processing condition creating section 4. In the event that the assist image processing condition creation in the step S2 is skipped, the reference image processing condition determining section 5 obtains the initial image processing condition created by the initial image processing condition creating section 3. Next, the process goes to a step S3_2.

In the step S3_2, the reference image processing condition determining section 5 determines the image processing condition obtained in the step S3_1 as a first reference image processing condition. The reference image processing condition thus determined is stored in the image processing condition storage section 120.

In parallel with the step S3_1 to the step S3_2, a step S3_3 is prosecuted. In the step S3_3, when any one of the plurality of adjustment execution buttons in the adjustment execution area a2 is clicked, an attribute of the original image to be subjected to the image processing is designated.

In the adjustment execution area a2 in the automatic set up window shown in FIG. 8, there exist a "highlight" adjustment execution button for adjustment as to the highlight, a "skin" adjustment execution button for adjustment as to color of the skin, a "sky" adjustment execution button for adjustment as to color of the sky, a "green" adjustment execution button for adjustment as to green of trees, a "brightness" adjustment execution button for adjustment as to brightness, and a custom adjustment execution button for adjustment as to items registered in a registration window (not illustrated), which are associated with attributes of images, respectively.

Figure 12:
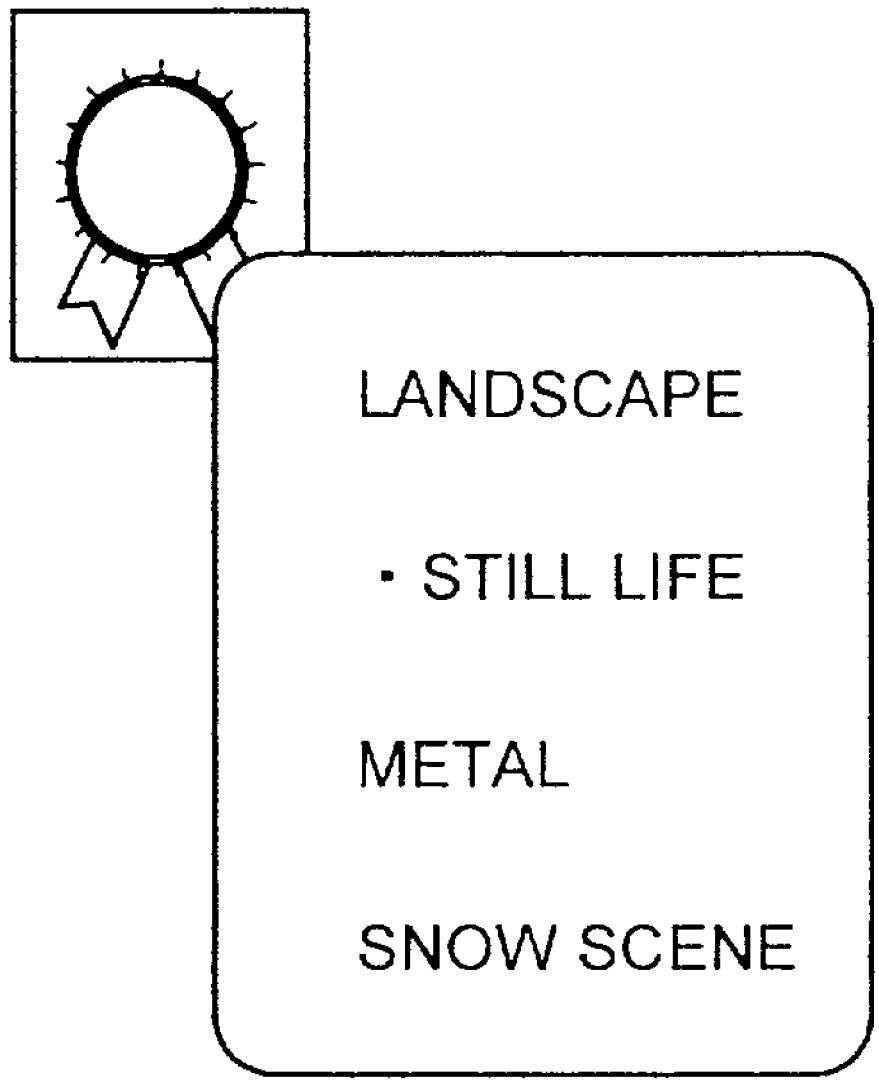
FIG. 12 is a view showing a pop-up window appearing on a custom adjustment execution button.

FIG. 12 is a view showing a pop-up window appearing on a custom adjustment execution button.

A pop-up window shown in FIG. 12 appears when the custom adjustment execution button is continued to be depressed over a certain time through an operation of the mouse. In the pop-up window, items of "landscape/still life/metal/snow scene" are displayed.

When an operator selectively clicks an adjustment execution button representative of a desired image attribute, or alternatively when an operator selectively clicks a desired item from among items displayed on the pop-up window, the image attribute designating section 11 designates an image attribute associated with the clicked button or item. The adjustment parameter determining section 12 determines an adjustment parameter according to the image attribute designated by the image attribute designating section 11.

In the event that the "skin" adjustment execution button of the adjustment execution area a2 is clicked, as adjustment parameters necessary for adjustment of color of the "skin", for example, three sorts of adjustment parameters of "brightness", "yellow-red" and "greenness" are decided. According to the present embodiment, the adjustment parameter determining section 12 decides three or more sorts of adjustment parameters for each item of adjustment execution buttons other than the "brightness" adjustment execution button and the custom adjustment execution button, in form of necessary adjustment parameters.

The adjustment parameter on the "brightness" has a structure shown in Table 1.

TABLE 1

| Parameter values | HLT set up densities C, M, Y | Highlight curves C, M, Y, K | Halftone curves C, M, Y, K | Shadow curves C, M, Y, K |
| --- | --- | --- | --- | --- |
| −3 | 0.2, 0.2, 0.2 | −5, −5, −5, 0 | −15, −15, −15, 0 | −1, −1, −1, 0 |
| −2 | 0.1, 0.1, 0.1 | −3, −3, −3, 0 | −12, −12, −12, 0 | −1, −1, −1, 0 |
| −1 | 0, 0, 0 | −1, −1, −1, 0 | −5, −5, −5, 0 | 0, 0, 0, 0 |
| 0 | 0, 0, 0 | 0, 0, 0, 0 | 0, 0, 0, 0 | 0, 0, 0, 0 |
| 1 | 0, 0, 0 | 1, 1, 1, 0 | 5, 5, 5, 0 | 1, 1, 1, 0 |
| 2 | 0, 0, 0 | 2, 2, 2, 0 | 8, 8, 8, 0 | 3, 3, 3, 0 |
| 3 | −0.1, −0.1, −0.1 | 3, 3, 3, 0 | 15, 15, 15, 0 | 5, 5, 5, 0 |

Table 1 shows the association between parameter values in parameter values −3,−2,−1, 0, 1, 2, 3 of the adjustment parameter "brightness" and combination of parameter values of a plurality of basic parameters. The left column of Table 1 denotes the parameter values −3 to 3 of the "brightness" in turn from the top.

The same stage as each of the parameter values of the "brightness" of the left column of Table 1 shows parameter values of the respective plurality of basic parameters defining the parameter values. For example, in the event that the parameter value of the "brightness" is −3, it is shown that the set up densities associated with the highlight points in the highlight curves of the colors of C, M and Y are 0.2, 0.2 and 0.2, respectively; the coefficients representative of the curvatures of the highlight curves of the colors of C, M, Y and K are −5,−5 −5 and 0, respectively; the coefficients representative of the curvatures of the halftone curves of the colors of C, M, Y and K are 15, 15, 15 and 0, respectively; and the coefficients representative of the curvatures of the shadow curves of the colors of C, M, Y and K are −1, −1 −1 and 0, respectively. In other words, the parameter value −3 of the "brightness" is defined by a combination {(0.2, 0.2, 0.2), (−5, −5, −5, 0), (15, 15, 15, 0), (−1, −1, −1, 0)} of parameter values of the plurality of basic parameters. Hereinafter, a combination of parameter values of the plurality of basic parameters, which defines the parameter value of the adjustment parameter, is referred to as the basic parameter value set.

In the event that the parameter value of the adjustment parameter "brightness" is 0, all parameter values of the basic parameter value set defining this parameter value are 0. Regardless of the adjustment parameter "brightness", in the event that the parameter value of the adjustment parameter is 0, it means that an adjustment for the image processing condition is not performed with respect to the adjustment parameter.

Parameter values of a number of basis parameters, which do not appear on Table 1, are 0 for any parameters of the function parameter "brightness", since it is not concerned with the adjustment parameter "brightness".

It is acceptable that the adjustment parameter is the basic parameter itself. However, as mentioned above, in the event that the adjustment parameter is defined by a combination of parameter values of a number of basic parameters, it is possible to freely define various adjustment parameters by altering the combination. Thus, a suitable adjustment of the combination of the parameter values of the basic parameters, corresponding to the parameter values of the adjustment, makes it easy to define parameters representative of a concept representative of human's visual sense, such as brightness, redness and hardness in such a manner that those parameters become good parameters in quality indicative of natural image changes in human's sense.

For example, with resect to the "brightness", it is possible to suppress changes of saturation caused by the change of the "brightness" by means of suitable selection of the parameter values of the basic parameters such as coefficients representative of the highlight point set up densities, the curvatures of highlight curve, halftone curve and shadow curve, which define the parameter values of the adjustment parameter "brightness".

While Table 1 shows the association in the parameter values in the range of −3 to 3, actually, there is defined the association in the parameter values in the broader range exceeding the range of −3 to 3.

Here, while the adjustment parameter "brightness" is raised by way of example, parameter values of the various adjustment parameters such as "yellow-red" and "greenness" are also defined by the reference parameter value set in a similar fashion to that of the adjustment parameter "brightness". The association between the adjustment parameter and the basic parameter set, as shown in Table 1, is stored in an association storage section.

After the step S3_2 and after the step S3_3, the process goes to a step S3_4.

In the step S3_4, first, the variation image processing condition creating section 6 obtains the reference image processing condition determined by the reference image processing condition determining section 5 in the step S3_2 and the adjustment parameters determined by the adjustment parameter determining section 12 in the step S3_3. The variation image processing condition creating section 6 creates a plurality of variation image processing conditions, wherein a parameter value of one of the obtained adjustment parameters is varied, in accordance with the obtained reference image processing condition. Likewise, the variation image processing condition creating section 6 creates a plurality of variation image processing conditions, wherein parameter values for the obtained adjustment parameters other than the one adjustment parameter are varied.

For example, in the event that the "skin" button in the adjustment execution area a2, there is created a plurality of variation image processing conditions associated with parameter values shown in Table 1 for the adjustment parameter "brightness" in accordance with the reference image processing condition determined by the reference image processing condition determining section 5 in the step S3_2, and likewise there are created a plurality of variation image processing conditions associated with parameter values for the adjustment parameter "yellow-red", and a plurality of variation image processing conditions associated with parameter values for the adjustment parameter "greenness". The variation image processing conditions thus created are stored in the image processing condition storage section 120.

Incidentally, the variation image processing conditions associated with a case where the parameter value of the adjustment parameter "brightness" is 0 is the reference image processing condition itself. Here, the plurality of variation image processing conditions on the adjustment parameter "brightness" includes the reference image processing condition. Likewise, it is assumed that variation image processing conditions for the adjustment parameters other than "brightness" also include the reference image processing condition. Next, the process goes to a step S3_5.

In the step S3_5, the image processing section 2 obtains the plurality of variation image processing conditions for the adjustment parameter "brightness" which are created by the variation image processing condition creating section 6, and creates a plurality of images in accordance with the plurality of variation image processing conditions. An assembly of the plurality of image thus created may constitute a string of images in which images are varied in "brightness" in turn. The image processing section 2 obtains the plurality of variation image processing conditions for the adjustment parameter "yellow-red" which are created by the variation image processing condition creating section 6, and creates a plurality of images in accordance with the plurality of variation image processing conditions. An assembly of the plurality of image thus created may constitute a string of images in which images are varied in color from yellowness to redness in turn. The image processing section 2 obtains the plurality of variation image processing conditions for the adjustment parameter "greenness" which are created by the variation image processing condition creating section 6, and creates a plurality of images in accordance with the plurality of variation image processing conditions. An assembly of the plurality of image thus created may constitute a string of images in which images are varied in "greenness" in turn. Next, the process goes to a step S3_6.

In the step S3_6, the strings of images created by the image processing section 2 in the step S3_5 are displayed on the display screen 102a.

Figure 13:
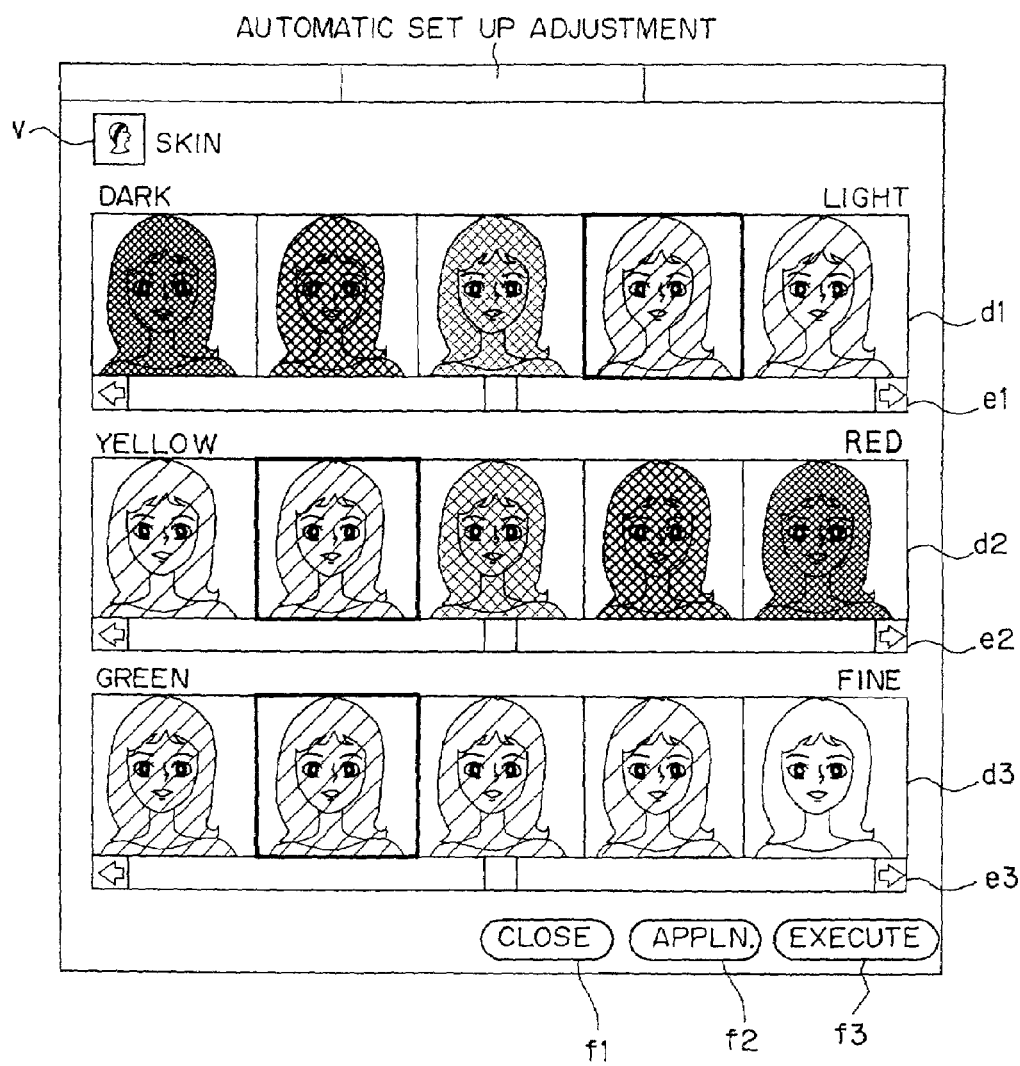
FIG. 13 is a view showing an automatic set up adjustment window.

FIG. 13 is a view showing an automatic set up adjustment window.

In an automatic set up adjustment window shown in FIG. 13, strings d1, d2 and d3 of images each comprising 5-preview images aligned on a one-dimensional basis are displayed on the upper row, the middle row and the lower row, respectively. The upper left of the automatic set up adjustment window shown in FIG. 13 shows an icon v indicative of the image attribute "skin". The strings d1, d2 and d3 of images of the upper row, the middle row and the lower row are associated with the three sorts of adjustment parameters determined for the image attribute "skin" by the adjustment parameter determining section 12 in the step S3_3, respectively.

The string d1 of images of the upper row is a string of images related to the adjustment parameter "brightness". In this string of images, the more left side image is concerned, the more dark it is, and the more right side image is concerned, the more light it is. The string d2 of images of the middle row is a string of images related to the adjustment parameter "yellow-red". In this string of images, the more left side image is concerned, the more yellowness is enhanced, and the more right side image is concerned, the more redness is enhanced. The string d2 of images of the lower row is a string of images related to the adjustment parameter "greenness". In this string of images, the more left side image is concerned, the more greenness is enhanced, and the more right side image is concerned, the less greenness is concerned.

All the images displayed with thick frames in those strings of images are the reference images that are subjected to the image processing in accordance with the reference image processing condition determined by the reference image processing condition determining section 5. The reference images in those strings of images are first located at their center of the strings of images.

In the automatic set up adjustment window, there are provided scroll bars e1, e2 and e3 below the strings d1, d2 and d3 of images, respectively. An operator operates, for example, the scroll bar e1 below the string d1 of images regarding the "brightness" to scroll the string d1 of images in the horizontal direction, so that the lighter image or the darker image can be displayed. Further, below the automatic set up adjustment window, there are provided a "close" button f1, an "application" button f2, and an "execution" button f3. Next, the process goes to a step S3_7.

In the step S3_7, the reference image set up section 13 sets up a new reference image in accordance with an operation of an operator. Specifically, the operator clicks through operation of the mouse a desired one of the whole images constituting the plurality of strings d1, d2 and d3 of images, so that the reference image set up section 13 sets up the clicked image as the new reference image. Next, the process goes to a step S3_8.

In the step S3_8, the reference image processing condition determining section 5 determines a new reference image processing condition associated with the new reference image set up in the step S3_7. Next, the process returns to the step S3_4 to the step S3_6.

This time of step S3_4 to step S3_6 is different from the first time of step S3_4 to step S3_6 only in the point that a new reference image processing condition associated with the reference image set up by the reference image set up section 13 is used. In a similar fashion to that of the first time of step S3_4 to step S3_6, a plurality of variation image processing conditions are created in accordance with the new reference image processing condition, so that a plurality of variation images, which is subjected to the image processing based on the plurality of variation image processing conditions thus created, is created. The plurality of variation images thus created is displayed on the automatic set up window in form of a string of images in which "brightness" is varied, a string of images in which the tone of "yellow-red" is varied, and a string of images in which "greenness" is varied. Those strings of images of "brightness", "yellow-red" and "greenness" are provided in form of a string of images in which the new reference image set up in accordance with an operation of an operator in the step S3_7 is displayed with the thick frame at the center of the associated string of images and is varied standardizing the reference image. Incidentally, the previously displayed reference image is removed in display of the thick frame.

Thereafter, an operator sequentially renews strings of images and selects images in such a manner that while the operator looks at the string of images displayed on the automatic set up adjustment window, the operator selects an image near one's favorite from a plurality of images constituting the full strings of images, and while the operator looks at a plurality of strings of images newly created taking the selected image as a new reference image, the operator selects an image nearer one's favorite. In this manner, the step S3_4 to the step S3_8 are repeated.

To exit the loop of the step S3_4 to the step S3_8, an operator clicks any one of the "close" button f1, the "application" button f2, and the "execution" button f3 on the automatic set up adjustment window. Thus, the full process of the step S3 consisting of the step S3_1 to the step S3_8 is completed.

When an operator clicks the "close" button f1, the automatic set up adjustment window is closed.

When an operator clicks the "application" button f2, the automatic set up adjustment window is closed, and the image processing condition determination in the step S4 is performed. That is, when the "application" button f2 is clicked, the image processing condition determining section 7 determines the reference image processing condition finally set up by the reference image processing condition determining section 5 in form of an image processing condition used in the image processing apparatus 100_2.

When an operator clicks the "execution" button f3, in a similar fashion to a case where the "application" button f2 is clicked, the automatic set up adjustment window is closed, and the image processing condition determination in the step S4 is performed. And in addition, the image processing condition output in the step S5 is performed. That is, when the "execution" button f3 is clicked, the image processing condition output section 8 outputs the image processing condition determined by the image processing condition determining section 7 to the image processing apparatus 100_2.

As described above, an operator can determine image processing conditions for the image processing apparatus 100_2, while the operator looks at the strings of images displayed on the automatic set up adjustment window in the image processing condition determining apparatus 100_1 according to the present embodiment.

Usually, an image processing condition bringing a desired image of an operator is defined by parameter values of a plurality of sorts of many adjustment parameters. Generally, many sorts of adjustment parameters make it difficult to locate the image processing condition bringing an image meeting an operator's favorite. Further, many sorts of adjustment parameters make it principally possible to locate an image processing condition bringing a desired image of an operator in such a manner that the conventional apparatus displaying a string of images representative of a variation of an image regarding a single adjustment parameter is used to select an image near an operator's favorite from among the displayed string of images, while selecting a sort of images to be displayed. However, work of changing over a string of images to be displayed is troublesome. And in the event that a suitable string of images is not displayed, it easily happens that the selected image is too far from the intended image. This involves a problem that it is difficult to reach the desired image.

This situation is also the same in case of the use of an apparatus displaying an assembly of images arranged on a two-dimensional basis, which are representative of variations of images regarding two adjustment parameters.

To the contrary, according to the image processing condition determining apparatus 100_1 of the present embodiment, simply clicking a button according to the attribute of the original image of interest in image processing, of the adjustment execution area a2 shown in the automatic set up window of FIG. 8 makes it possible to readily obtain the adjustment parameter necessary according to the attribute. Thus, it is sufficient for the image processing condition determining apparatus 100_1 of the present embodiment to simply deal with the necessary minimum adjustment parameters.

Further, according to the image processing condition determining apparatus 100_1 of the present embodiment, three or more strings of images are displayed at once. This feature makes it hard to bring about a problem due to selection of a string of images to be displayed, and makes it easy to perform selection of images. It is preferable for the image processing condition determining apparatus 100_1 of the present embodiment that all the strings of images associated with the necessary minimum adjustment parameters are displayed at once to avoid necessity for selection.

An operator uses the image processing condition determining apparatus 100_1 of the present embodiment and sequentially renews strings of images and selects images in such a manner that while the operator looks at the string of images displayed on the automatic set up adjustment window, the operator selects an image near one's favorite from a plurality of images constituting the full strings of images, and while the operator looks at a plurality of strings of images newly created taking the selected image as a new reference image, the operator selects an image nearer one's favorite. In this manner, the operator can reach an image associated with a desired image processing condition meeting one's favorite in short time, and decide the desired image processing condition as an image processing condition for the original image.

By the way, the above explanation is made by way of example showing a case where an operator clicks the "skin" button in the adjustment execution area a2 shown in the automatic set up window of FIG. 8. Hereinafter, there will be explained a case where an operator clicks the "brightness" button in the adjustment execution area a2, particularly differences from the case where an operator clicks the "skin" button.

In the event that an operator clicks the "brightness" button in the adjustment execution area a2, the adjustment parameter determined by the adjustment parameter determining section 12 in the step S3_3 shown in the flowchart of FIG. 11 is only the adjustment parameter "brightness".

In this case, in the step S3_4, the variation image processing condition creating section 6 creates, taking the reference image processing condition determined in the step S3_2 or the step S3_8 as a reference, for example, a plurality of variation image processing conditions associated with the parameter values varying in the adjustment parameter "brightness" every ten, a plurality of variation image processing conditions associated with the parameter values varying in the adjustment parameter "brightness" every five, and a plurality of variation image processing conditions associated with the parameter values varying in the adjustment parameter "brightness" every one.

In the step S3_5, the image processing section 2 applies the image processing to the initial image in accordance with the plurality of variation image processing conditions created in the variation image processing condition creating section 6 in the step S3_4 to create a plurality of variation images.

Figure 14:
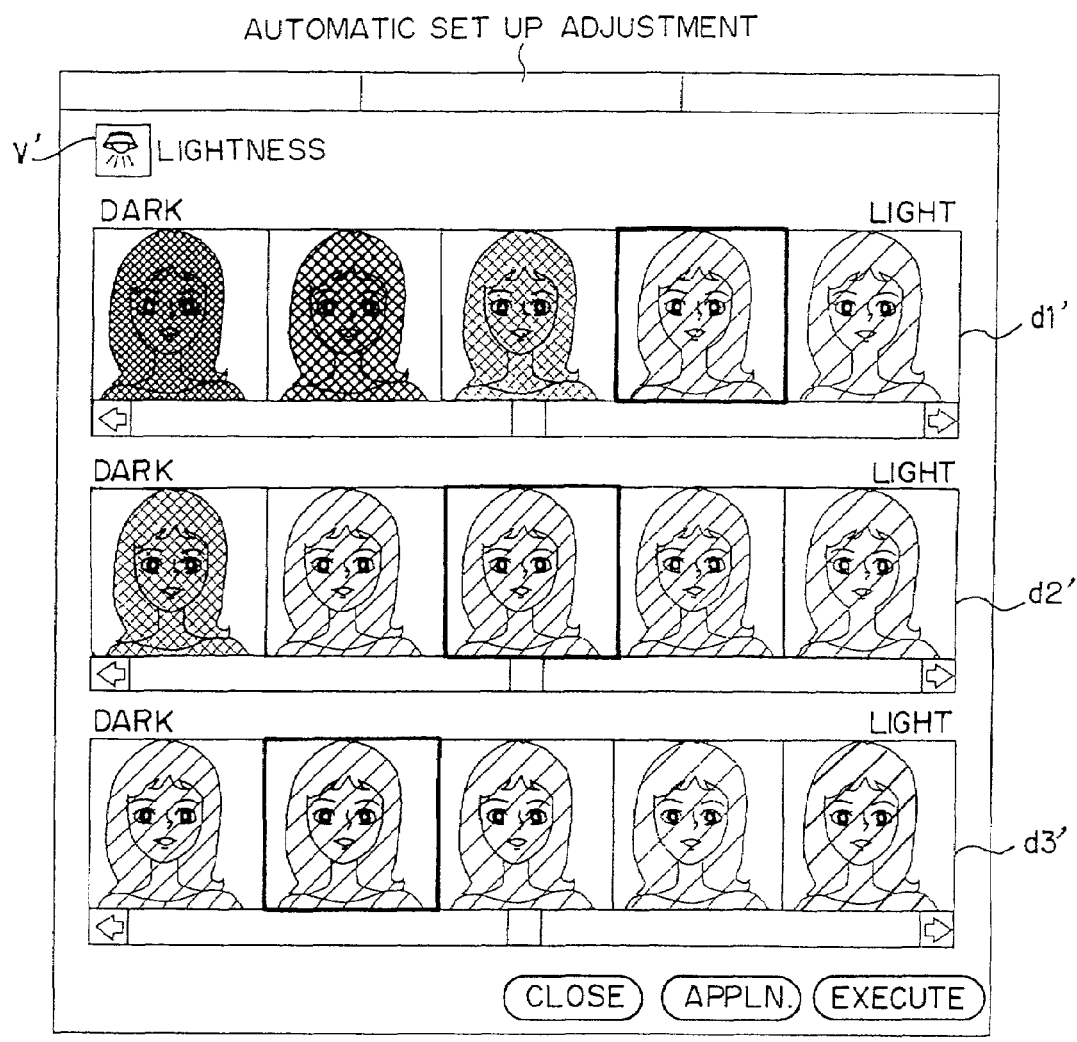
FIG. 14 is a view showing an automatic set up adjustment window.

In the step S3_6, the plurality of variation images created by the image processing section 2 in the step S3_5 are displayed on the display screen 102a as shown in FIG. 14.

FIG. 14 is a view showing an automatic set up adjustment window.

An automatic set up adjustment window shown in FIG. 14 is different from the automatic set up adjustment window shown in FIG. 13 in the point that at the upper left an icon v' indicative of the image attribute "brightness" is shown, and strings d1', d2' and d3' of images each comprising 5-preview images aligned on a one-dimensional basis are displayed on the upper row, the middle row and the lower row, respectively. The strings d1', d2' and d3' of images of the upper row, the middle row and the lower row are associated with the adjustment parameter "brightness".

In any of those strings d1', d2' and d3' of images, the more left side image is concerned, the more dark it is, and the more right side image is concerned, the more light it is. The string d1' of images of the upper row is a string of images involved in the largest variation of brightness every image. The string d3' of images of the lower row is a string of images involved in the smallest variation of brightness every image. The string d1' of images is a string of images consisting of a plurality of variation images associated with the parameter values varying in the adjustment parameter "brightness" every ten. The string d2' of images is a string of images consisting of a plurality of variation images associated with the parameter values varying in the adjustment parameter "brightness" every five. The string d2' of images is a string of images consisting of a plurality of variation images associated with the parameter values varying in the adjustment parameter "brightness" every one.

An operator can select a desired image in such a manner that while the operator looks at the strings d1', d2' and d3' of images displayed on the automatic set up adjustment window, the operator clicks one's favorite image from among those full strings of images. In the step S3_7, the reference image set up section 13 sets up the thus selected image as a new reference image. In the step S3_8, the reference image processing condition determining section 5 determines the reference image processing condition associated with the new reference image thus set up a new reference image processing condition. In the step S3_4 to the step S3_8, renewals of the reference image and the strings of images are repeated in accordance with operation of an operator, so that an operator's favorite brightness of image can be obtained.

In this manner, the use of the image processing condition determining apparatus 100_1 of the present embodiment makes it possible for an operator to perform in parallel rough adjustment and fine adjustment with respect to the single adjustment parameter, as in the above-mentioned adjustment parameter "brightness". Thus, according to the image processing condition determining apparatus 100_1 of the present embodiment, it is possible to readily perform a determination of image processing conditions for an original image in short time.

It is acceptable that an image processing condition determining apparatus of the present embodiment displays on the automatic set up adjustment window a plurality of strings of images as to a plurality of sorts of adjustment parameters, including strings of images in which parameter values of the same adjustment parameter are varied with mutually different variation widths.

As mentioned above, according to the present invention, there are provided an image processing condition determining apparatus capable of determining a desired image processing condition in short time by a general operator, and an image processing condition determining program storage medium storing an image processing condition determining program which causes a computer system to operate as an image processing condition determining apparatus when the image processing condition determining program is executed in the computer system.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image processing condition determining apparatus for determining image processing conditions defining contents of image processing wherein an original image is subjected to the image processing, said image processing condition determining apparatus comprising:

an image obtaining section for obtaining an initial image associated with the original image;

an image creating section for performing an image creating processing wherein an image assembly, consisting of the initial image obtained by said image obtaining section or consisting of a reference image in which a predetermined image processing is applied to the initial image and a plurality of variation images in which image processing is applied to the initial image in accordance with an image processing condition wherein a parameter value of an adjustment parameter selected from a plurality of parameters is varied, taking as a reference a reference image processing condition for obtaining the reference image of image processing conditions defined by a set of parameter values of the plurality of parameters, is created for each of three or more sorts of adjustment parameters;

a display section for displaying the image assembly created by said image creating section;

a reference image set up section for setting up one of a plurality of images constituting a plurality of image assemblies displayed on said display section in a form of a new reference image according to an operation of an operator; and an image processing condition determining section for determining a reference image processing condition associated with the reference image finally set up by said reference image set up section in a form of an image processing condition where the original image is subjected to the image processing, in accordance with the operation, wherein said image creating section repeats said image creating processing, upon receipt of set up of the reference image, taking an image processing condition for creating a set up new reference image as a new reference image processing condition.

2. An image processing condition determining apparatus according to claim 1, further comprising:

an image attribute designating section for designating an attribute of an image in accordance with another operation of the operator, and a parameter determining section for determining the adjustment parameter in accordance with the attribute designated by said image attribute designating section, wherein said image creating section creates the image assembly on the adjustment parameter determined by said parameter determining section.

3. An image processing condition determining apparatus according to claim 1, wherein said image creating section creates three or more image assemblies including at least two image assemblies in which a parameter value of a same adjustment parameter is varied with mutually different variation widths, instead of creating the image assembly for each of three or more sorts of adjustment parameters.

4. An image processing condition determining program storage medium storing an image processing condition determining program which causes a computer system to operate as an image processing condition determining apparatus when the image processing condition determining program is executed in the computer system, said image processing condition determining program comprising:
- an image obtaining section for obtaining an initial image associated with an original image;
- an image creating section for performing an image creating processing wherein an image assembly, consisting of the initial image obtained by said image obtaining section or consisting of a reference image in which a predetermined image processing is applied to the initial image and a plurality of variation images in which image processing is applied to the initial image in accordance with an image processing condition wherein a parameter value of an adjustment parameter selected from a plurality of parameters is varied, taking as a reference a reference image processing condition for obtaining the reference image of image processing conditions defined by a set of parameter values of the plurality of parameters, is created for each of three or more sorts of adjustment parameters;
- a reference image set up section for setting up one of a plurality of images constituting a plurality of image assemblies created by said image creating section in a form of a new reference image according to an operation of an operator; and
- an image processing condition determining section for determining a reference image processing condition associated with the reference image finally set up by said reference image set up section in a form of an image processing condition where the original image is subjected to the image processing, in accordance with the operation,
- wherein said image creating section repeats said image creating processing, upon receipt of set up of the reference image, taking an image processing condition for creating a set up new reference image as a new reference image processing condition.

5. An image processing condition determining apparatus according to claim 1, wherein the operator selects the one of a plurality of images as a first favorite image and selects a second favorite image from another plurality of images taking the first favorite image as the new reference image.

6. An image processing condition determining apparatus according to claim 1, wherein the operator parallely performs rough adjustment and fine adjustment with respect to the selected adjustment parameter.

7. An image processing condition determining apparatus according to claim 1, wherein the image processing conditions include at least one of factors representative of brightness parameters including highlight point set up densities and curvatures of a highlight curve, halftone curve and shadow curve.

8. An image processing condition determining apparatus according to claim 1, wherein the plurality of parameters include at least one of highlights, sky, skin and brightness.

9. An image processing condition determining apparatus according to claim 1, wherein the image assembly is a string of images.

10. An image processing condition determining apparatus according to claim 1, further comprising:
- a pick point designating section for designating pick points on the image assembly displayed on said display section in accordance with another operation of the operator; and
- an assist item set up section for setting up a state of condition of the pick point designated by said pick point designating section in accordance with another operation of the operator.

11. An image processing condition determining method for determining image processing conditions defining contents of image processing wherein an original image is subjected to the image processing, said image processing condition determining method comprising:
- obtaining an initial image associated with the original image;
- performing an image creating processing wherein an image assembly, consisting of the initial image obtained by said image obtaining section or consisting of a reference image in which a predetermined image processing is applied to the initial image and a plurality of variation images in which image processing is applied to the initial image in accordance with an image processing condition wherein a parameter value of an adjustment parameter selected from a plurality of parameters is varied, taking as a reference a reference image processing condition for obtaining the reference image of image processing conditions defined by a set of parameter values of the plurality of parameters, is created for each of three or more sorts of adjustment parameters;
- displaying created the image assembly;
- setting up one of a plurality of images constituting a plurality of displayed image assemblies in a form of a new reference image according to an operation; and
- determining a reference image processing condition associated with the finally set up reference image in a form of an image processing condition where the original image is subjected to the image processing, in accordance with the operation,
- wherein said image creating processing is repeated upon receipt of set up of the reference image, taking an image processing condition for creating a set up new reference image as a new reference image processing condition.

12. An image processing condition determining method according to claim 11, further comprising:
- designating an attribute of an image in accordance with another operation, and
- determining the adjustment parameter in accordance with the designated attribute,
- wherein the image assembly is created on the determined adjustment parameter.

13. An image processing condition determining method according to claim 11, wherein three or more image assemblies is created including at least two image assemblies in which a parameter value of a same adjustment parameter is varied with mutually different variation widths, instead of creating the image assembly for each of three or more sorts of adjustment parameters.

14. An image processing condition determining method according to claim 11, wherein an operator selects the one of a plurality of images as a first favorite image and selects a second favorite image from another plurality of images taking the first favorite image as the new reference image.

15. An image processing condition determining method according to claim 11, wherein an operator parallely performs rough adjustment and fine adjustment with respect to the selected adjustment parameter.

16. An image processing condition determining apparatus for determining image processing conditions defining contents of image processing wherein an original image is subjected to the image processing, said image processing condition determining apparatus comprising:
- an image obtaining section for obtaining an initial image associated with the original image;

an image creating section for performing an image creating processing wherein an image assembly, comprising a reference image in which a predetermined image processing is applied to the initial image and a plurality of variation images in which image processing is applied to the initial image in accordance with an image processing condition wherein a parameter value of an adjustment parameter selected from a plurality of parameters is varied, taking as a reference a reference image processing condition for obtaining the reference image of image processing conditions defined by a set of parameter values of the plurality of parameters, is created for each of three or more sorts of adjustment parameters;

a display section for displaying the image assembly created by said image creating section;

a reference image set up section for setting up one of a plurality of images constituting a plurality of image assemblies displayed on said display section in a form of a new reference image according to an operation of an operator; and an image processing condition determining section for determining a reference image processing condition associated with the reference image finally set up by said reference image set up section in a form of an image processing condition where the original image is subjected to the image processing, in accordance with the operation, wherein said image creating section repeats said image creating processing, upon receipt of set up of the reference image, taking an image processing condition for creating a set up new reference image as a new reference image processing condition.

* * * * *